US008225077B2

(12) United States Patent
Sato et al.

(10) Patent No.: US 8,225,077 B2
(45) Date of Patent: Jul. 17, 2012

(54) OBFUSCATION DEVICE FOR GENERATING A SET OF OBFUSCATED INSTRUCTIONS, PROCESSING DEVICE, METHOD, PROGRAM, AND INTEGRATED CIRCUIT THEREOF

(75) Inventors: Taichi Sato, Kyoto (JP); Tomoyuki Haga, Nara (JP); Kenichi Matsumoto, Nara (JP); Akito Monden, Nara (JP); Haruaki Tamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 692 days.

(21) Appl. No.: 12/409,756

(22) Filed: Mar. 24, 2009

(65) Prior Publication Data

US 2009/0254738 A1 Oct. 8, 2009

(30) Foreign Application Priority Data

Mar. 25, 2008 (JP) ................................. 2008-078779

(51) Int. Cl.
G06F 9/00 (2006.01)
(52) U.S. Cl. .................. 712/241; 712/234; 712/233
(58) Field of Classification Search .................. None
See application file for complete search history.

(56) References Cited

U.S. PATENT DOCUMENTS

| 6,643,775 | B1* | 11/2003 | Granger et al. ............ 713/190 |
| 6,817,013 | B2* | 11/2004 | Tabata et al. ............. 717/151 |
| 2002/0083310 | A1* | 6/2002 | Morris et al. ............. 712/233 |
| 2003/0200426 | A1* | 10/2003 | Lee et al. ............... 712/241 |
| 2005/0002531 | A1* | 1/2005 | Michaelsen .............. 380/268 |
| 2005/0071655 | A1* | 3/2005 | de Jong ................ 713/190 |
| 2008/0189513 | A1* | 8/2008 | Hutson .................. 712/7 |
| 2008/0215862 | A1 | 9/2008 | Haga et al. |
| 2008/0288921 | A1* | 11/2008 | Jacob et al. ............. 717/120 |
| 2009/0083521 | A1* | 3/2009 | Sato et al. .............. 712/220 |
| 2009/0177873 | A1* | 7/2009 | Sato et al. .............. 712/233 |
| 2009/0249492 | A1* | 10/2009 | Boesgaard Sorensen ...... 726/27 |
| 2009/0327674 | A1* | 12/2009 | Codrescu et al. .......... 712/241 |

FOREIGN PATENT DOCUMENTS

| JP | 2000-76064 | 3/2000 |
| WO | 2006/001365 | 1/2006 |

* cited by examiner

*Primary Examiner* — Idriss N Alrobaye
(74) *Attorney, Agent, or Firm* — Wenderoth, Lind & Ponack, L.L.P.

(57) ABSTRACT

An obfuscation device includes a first instruction generating unit, for each of a first process and a second process, which generates an initialization instruction for securing a management area for managing identification information indicating an instruction block that should be executed next so as to proceed with the process. Further, a second instruction generating unit generates a selection instruction (i) to make a first selection selecting a process that should be proceeded out of the first process and the second process, (ii) to make a second selection selecting an instruction block indicated by the identification information managed in the management area as an instruction block that should be executed for proceeding with the process selected by the first selection, and (iii) to cause the execution device to execute the instruction block selected by the second selection, and stores the selection instruction in a storage unit.

9 Claims, 21 Drawing Sheets

Transformed set of original instructions

```
int main(){
  for (i=0; i<1; i++){
    // Process in A10
    // Process in A11
    ···//Process in A12 to A17···
    // Process in A18
  }
  // Process in A19
  // Process in B20
  // Process in B21
  ···//Process in B22 to B25···
  // Process in B26_2
  ···//Process in B27 to B28···
  // Process in B29
}
```

OBFUSCATION DEVICE FOR GENERATING A SET OF OBFUSCATED INSTRUCTIONS, PROCESSING DEVICE, METHOD, PROGRAM, AND INTEGRATED CIRCUIT THEREOF

BACKGROUND OF THE INVENTION (1) Field of the Invention

The present invention relates to a technology for making it difficult to analyze the program by making the execution order of the instruction blocks configuring the program complex.

(2) Description of the Related Art

Among the programs that operate on a computer, there are programs that cause disadvantages when sets of instruction that performs a certain process and sets of instructions that perform other processes are distinguished. Example of such program is a program including a process for checking tampering. Usually, the program having the tampering checking function includes a set of instructions for performing the tampering check, a set of instructions for performing valid process when no tampering is found, and a set of instructions for performing an exceptional process when tampering is found. In this case, when it is specified where the set of instructions for checking tampering is in the part of the programs, the following problems would arise. More specifically, analyzing the set of instruction for checking tampering with priority and altering the set of instruction so that the tampering check is skipped allows tampering the program such that the valid process is performed regardless of the result of the tampering check.

Furthermore, another example includes a case where information to be kept confidential is included in the program and the information is calculated from a specific set of instructions. Here, the secret information is information that causes some disadvantages to a provider of the program through analysis or alteration. More specifically, the information to be kept confidential includes, for example, a key for decrypting encrypted data, programs other than the program, information used for authenticating the validity of the device itself (the program or the device where the program is executed) with regard to a device other than the device where the program is executed, and information indicating the usage right of contents such as a movie. In this case, when the set of instruction to be kept secret is specified in each set of instructions included in the program, analyzing and altering the set of instructions reveals the information to be kept confidential, or assigning invalid right to an invalid person.

Another example of distinguishing the set of instructions for performing a process and a set of instruction for performing another process is monitoring the sets of instructions that are successively executed. Generally, in a program where no measure has been taken for analysis, the sets of instructions necessary for performing a certain process is successively executed, and the execution result is usually assigned to a specific variable. With this characteristic, it is possible to assume that the part where the specific variable is not used among the sets of instructions that are successively executed is a part where the processes are switched.

In order to avoid such an attack, there is a technique disclosed in Patent Reference 1, for example, which makes the analysis difficult by switching the execution order of the set of instructions which execute processes that are not related each other, and by executing each set of the instructions in the order after the switching. Here, if the same result as the result generated by the original program cannot be obtained due to the switching of the execution order, the original purpose of the program is not achieved. For this reason, the switching of the execution order needs to be performed in a range where it does not affect the execution result of the program.

[Patent Reference 1] Japanese Unexamined Patent Application Publication No. 2000-076064

[Patent Reference 2] International Publication WO2006/001365

However, the switching of the execution order shown in the conventional technology has a problem that the analysis is not fully made difficult in a program which has a complex control configuration including branching and a loop.

FIG. 1 shows an inclusive set of instructions D including the set of instructions for the process 1 and the set of instructions for the process 2. Note that the term "inclusive set of instruction" is used for the set of instructions referring the set of instructions included in the set of instructions.

The problem is described with reference to FIG. 1. The program D on the leftmost part of FIG. 1 includes the first set of instructions executing the process 1 and the second set of instructions executing the process 2. The first set of instructions executing the process 1 includes three blocks, namely, the block A1, the block A2, and the block A3. The set of instructions executing the process 2 includes 6 blocks, namely, the block B1, the block B2 . . . and the block B6. Here, each block is a significant unit including one or more instructions, and is also referred to as an instruction block. Furthermore, for the simplicity of explanation, the process 1 and the process 2 are considered to be processes independent of each other. More specifically, the processes are not in the relationship where one of the blocks in the process 2 cannot be executed unless one of the blocks in the process 1 is executed (or vice versa).

As shown in FIG. 1, in the process 1, correct result can be obtained when each block is executed once in an order from A1, A2, to A3. Furthermore, in the process 2, correct result can be obtained when each block is executed in an order B1, B2 . . . , and the process to go back to B2 after B6 is executed is repeated for a few times.

In this case, when the execution order of the sets of instructions is switched without taking the control configuration of the set of instructions (loop), the blocks among the set of instructions executing the process 1 (the block A1 to the block A3) that are positioned in the loop in the process 2 are executed for multiple times. For example, the block is repeated as many as the number of the times that the loop is repeated. Each set of instructions (block) configuring the process 1 is originally configured to obtain a correct result when it is executed once. Accordingly, when each of the instructions (each block) is executed in such an execution order, the correct result cannot be obtained (for example, see the inclusive set of instructions D1 in the middle of FIG. 1).

On the other hand, when the execution order of each set of instructions (each block) is modified taking into consideration of the control configuration such that the execution result is not affected, there is a limited number of blocks whose execution order can be switched (for example, the inclusive set of instructions D2 on the right of FIG. 1). Thus, the limited switching facilitates separating (distinguishing) the set of instructions configuring the process 1 and the set of instructions configuring the loop in the process 2 (blocks B2 to B6), and it would be difficult to fully prevent the attack by the invalid analyzer.

In view of the foregoing, it is an object of the present invention to provide a processing device and a program which makes the distinction between the instruction block configuring a certain process and the instruction block configuring the other processes even in a program having a complex control configuration difficult, and an obfuscation device which generates a program thereof.

SUMMARY OF THE INVENTION

The obfuscation device according to the present invention is an obfuscation device which generates a set of obfuscated instructions, by obfuscating a set of original process instructions, the set of obfuscated instructions being executed by said execution device, the obfuscation device including: a storage unit which stores the set of original process instructions including a first set of instructions and a second set of instructions, the first set of instructions being for performing a first process, and the second set of instructions being for performing a second process and the second set of instructions including a loop instruction for repeatedly performing at least a part of the second process; a dividing unit which respectively divides the first set of instructions and the second set of instructions into a plurality of instruction blocks; an assigning unit which assigns identification information to each of the plurality of instruction blocks; a first instruction generating unit which, for each of the first process and the second process, generates an initialization instruction, the initialization instruction being for securing a management area in said execution device, the management area being for managing the identification information indicating an instruction block that should be executed next to each of the first process and the second process, and to store the initialization instruction in the storage unit; a second instruction generating unit which generates a selection instruction (i) to make a first selection form the first process and the second process selecting a process that should be proceeded, (ii) to make a second selection selecting an instruction block indicated by the identification information managed in the management area, as an instruction block that should be executed for proceeding with one of the first process and the second process selected by the first selection, and (iii) to generate selection instruction for causing the execution device to execute the instruction block selected by the second selection, and store the selection instruction in the storage unit; a third instruction generating unit which generates an updating instruction for updating, when the second process is selected by the first selection, and when the loop instruction included in the second process is executed, the identification information regarding the first process managed in the management area to identification information indicating an instruction block to be executed next to the first process which is selected by the first selection, and to store the updating instruction in the storage unit; and a set of instruction generating unit which generates the set of obfuscated instructions based on the initialization instruction, the selection instruction, the updating instruction, and the plurality of instruction blocks assigned with the identification information and to store the set of obfuscated instructions in the storage unit.

The processing device according to the present invention produces an effect for making it difficult to distinguish the instruction blocks configuring certain process and the instruction blocks configuring other processes, even in a program having a complex control configuration.

FURTHER INFORMATION ABOUT TECHNICAL BACKGROUND TO THIS APPLICATION

The disclosure of Japanese Patent Application No. 2008-078779 filed on Mar. 25, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 16 shows an example of the set of original process instructions;

DESCRIPTION OF THE PREFERRED EMBODIMENT(S)

Figure 1:
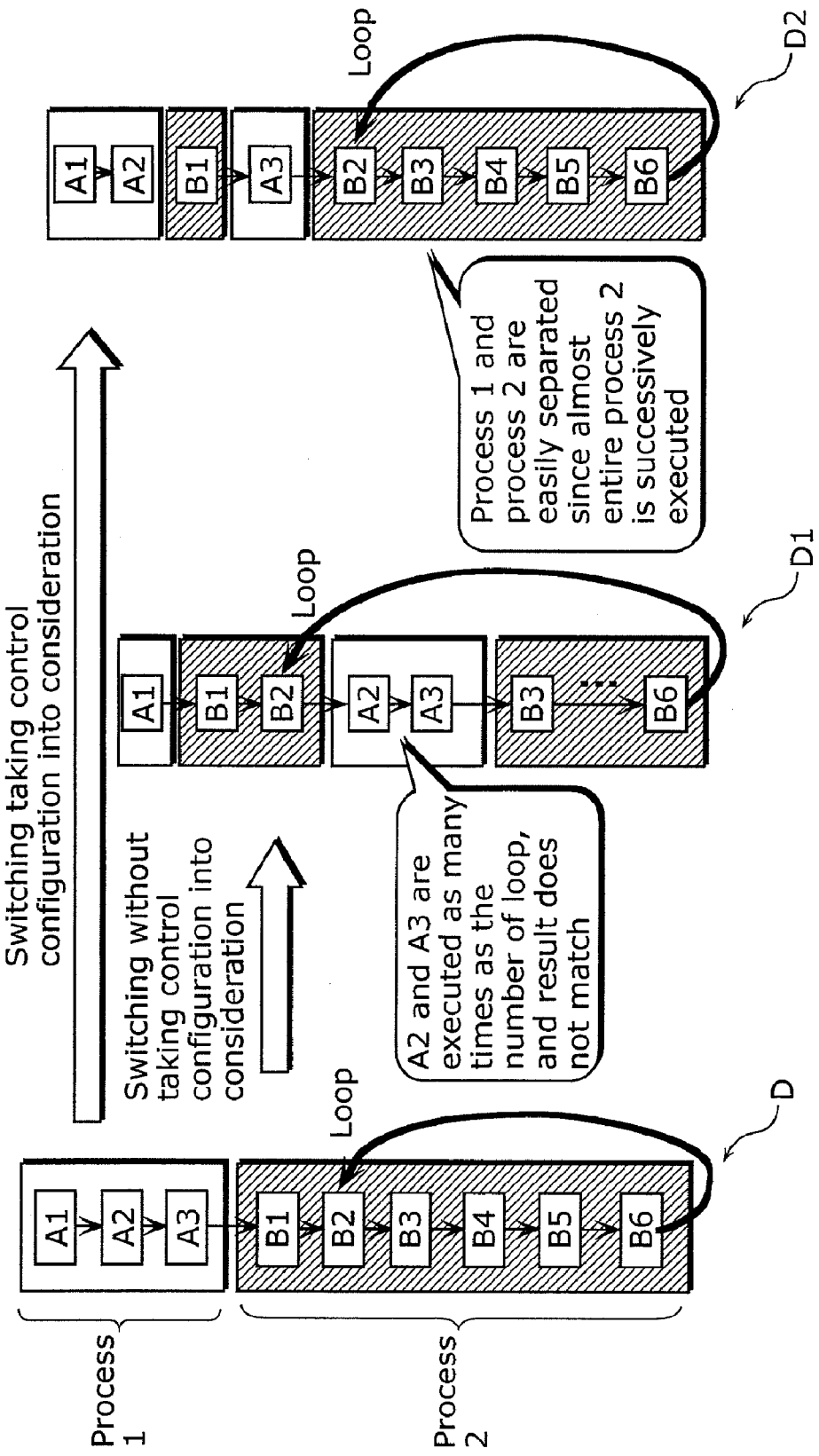
FIG. 1 shows the problem with the conventional technique.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

There have been conventional techniques for changing the execution order of the instruction block composing each process, in order to make it difficult for the unauthorized analyzer to distinguish each process composing the program. However, there is a problem that the range where the switching is possible is limited in the case where the program includes a loop. Thus, in the embodiments, a block number holding unit which records the progress status of the process is provided. The selection of the block number holding unit achieves individual management of the progress status, and which process is to be executed next. This allows switching of the order in a wider range than the conventional technique, because it is possible to switch the execution order of each block while understanding the processing status of each process, even when a loop is included in the original program.

The processing device according to the first embodiment is a processing device which implements a plurality of processes including a loop instruction, the processing device including: a holding unit which holds a plurality of instruction blocks for each of the plurality of processes, the plurality of instruction blocks being executed in a predetermined order so as to implement each of the first process and the second process; a management unit which manages identification information for each of the plurality of processes, the identification information indicating an instruction block that should be executed next so as to proceed with each of the first process and the second process; a selection unit which makes a first selection selecting a process that should be proceeded out of the plurality of processes, and to make a second selection selecting an instruction block indicated by the identification information managed in the management unit, regarding each of the first process and the second process, as an instruction block that should be executed for proceeding with the process selected by the first selection; an execution unit which executes the instruction block selected by the second selection; and an updating unit which updates the identification information regarding the first process managed in the management unit to updated identification information indicating an instruction block to be executed next in the first process which is selected by first selection, when the second process is selected by the first selection, and when the loop instruction included in the second process is executed by the execution unit.

With this configuration, the processing device according to the present invention can proceed with the process while grasping the progress of the instruction blocks configuring each process by the management unit. Accordingly, even in the program having a complex control configuration, it is possible to make the execution order of the instruction blocks configuring each process complex, and to make it difficult to distinguish the instruction blocks configuring a certain process with the instruction blocks configuring other processes.

The processing device according to the first embodiment selects, at random, a process that should be proceeded.

With this configuration, the processing device according to the first embodiment, the process that should proceed is selected at random. Thus, it is difficult for an unauthorized analyzer to identify which process is implemented by the instruction being executed. Accordingly, it is difficult for the unauthorized analyzer to distinguish the instruction blocks.

The processing device according to the first embodiment further includes at least one of the plurality of processes includes a dependent block performing an operation dependent on a process result of a process other than the implemented process, and the selection unit is configured to select only an instruction block different from instruction blocks after the dependent block until the process result of the other process is obtained.

With this configuration, the processing device according to the first embodiment, it is possible to adjust the execution order of the instruction blocks such that normal operation is performed taking into consideration of the dependency when there is a dependency between processes, even if the instruction blocks are executed at random.

The obfuscation device according to this embodiment is an obfuscation device which generates a set of obfuscated instructions by obfuscating a set of original process instructions, the set of obfuscated instructions being executed by the execution device, the obfuscation device comprising: a storage unit which stores the set of original process instructions including a first set of instructions and a second set of instructions, the first set of instructions being for performing a first process, and the second set of instructions being for performing a second process and the second set of instructions including a loop instruction for repeatedly performing at least a part of the second process; a dividing unit which respectively divides the first set of instructions and the second set of instructions into a plurality of instruction blocks; an assigning unit which assigns identification information to each of the plurality of instruction blocks; a first instruction generating unit which, for each of the first process and the second process, generates an initialization instruction, the initialization instruction being for securing a management area in the execution device, the management area being for managing the identification information indicating an instruction block that should be executed next to each of the first process and the second process, and to store the initialization instruction in the storage unit; a second instruction generating unit which generates a selection instruction (i) to make a first selection form the first process and the second process selecting from a process that should be proceeded, (ii) to make a second selection for selecting an instruction block indicated by the identification information managed in the management area, as an instruction block that should be executed for proceeding with one of the first process and the second process selected by the first selection, and (iii) to generate selection instruction for causing the execution device to execute the instruction block selected by the second selection, and store the selection instruction in the storage unit; a third instruction generating unit which generates an updating instruction for updating, when the second process is selected by the first selection, and when the loop instruction included in the second process is executed, the identification information regarding the first process managed in the management area to identification information indicating an instruction block to be executed next to the first process which is selected by the first selection, and to store the updating instruction in the storage unit; and a set of instruction generating unit configured to generate the set of obfuscated instructions based on the initialization instruction, the selection instruction, the updating instruction, and the plurality of instruction blocks assigned with the identification information and to store the set of obfuscated instructions in the storage unit.

With this configuration, the obfuscation device according to the first embodiment can obfuscates the set of original process instructions. Furthermore, the set of obfuscated instructions generated by the obfuscation can proceed with the process while grasping the progress of the execution-regarding the instruction block configuring each process by the management area. Accordingly, even when the set of original process instructions has a complex control configuration, it is possible to make the execution order of the instruction blocks configuring each process complex, and to make it difficult to distinguish the instruction blocks configuring a certain process with the instruction blocks configuring other processes.

The obfuscation device according to the embodiment further includes, in which at least one of the first set of instructions and the second set of instructions includes a conditional branching instruction which performs conditional branching according to a value of a variable, a dependent unit configured to replace an instruction block in a branch indicated by the conditional branching instruction or an instruction block to be executed after the branch with a dependent block, dependent block being for performing (i) an operation which can obtain a result identical to a result of the process by the instruction block before the replacement in the case where a value to be assigned to the variable is a value that should be assigned to the variable when the conditional branching instruction branches to the branch, and (ii) an operation which can obtain a result different from the result by the instruction block in the case where a value to be assigned to the variable is a value different from a value that should be assigned when the conditional branching instruction branches to the branch; and a deletion unit configured to delete the conditional branching instruction from the instruction block including the conditional branching instruction.

According to the configuration, the obfuscation device according to the first embodiment, it is possible to mask the conditional branching instruction which is likely to be a target of unauthorized analysis.

The obfuscation device according this embodiment, further generates an instruction for selecting, at random, a process one of the first process and the second process as the selection instruction With this configuration, the processing device according to the first embodiment, the process that should proceed is selected at random. Thus, it is difficult for an unauthorized analyzer to identify which process is implemented by the instruction being executed. Accordingly, it is difficult for the unauthorized analyzer to distinguish the instruction blocks.

The obfuscation device according the embodiment in which the plurality of instruction blocks includes a dependent block, the plurality of instruction blocks implementing at least one of the first process and the second process, and the dependent block performing an operation dependent on a process result of a process other than the implemented process, and the second instruction generating unit is configured to generate, as the select instruction, an instruction for selecting only an instruction block different from instruction blocks after the dependent block until the process result of the other process is obtained.

With this configuration, the set of set of obfuscated instructions generated by the processing device according to the first embodiment, it is possible to adjust the execution order of the instruction blocks such that normal operation is performed taking into consideration of the dependency when there is a dependency between processes, even if the instruction blocks are executed at random. The obfuscation device according to the embodiment, in which the dividing unit is configured to expand the loop by the loop instruction and divide the loop when the second set of instructions are divided, and the third instruction generating unit is configured to generate an instruction, as the updating instruction for each of the instruction blocks corresponding to the repeat in the expanded loop, (i) for updating the identification information to first updated identification information indicating an instruction block located in the beginning of the loop when the instruction block is an instruction block corresponding to any of the repeat in the loop except for the last repeat in the loop, and (ii) for updating the identification information to second updated identification information indicating an instruction block to be executed after the repeat in the loop is finished when the instruction block is an instruction block corresponding to the last repeat in the loop.

The obfuscation device according this embodiment, in which the third instruction generating unit is configured to generate an instruction, as the updating instruction for the instruction block that is executed last in the loop by the loop instruction, (i) for updating the identification information to updated identification information indicating an instruction block in the beginning of the loop when the instruction block is executed in any of the repeat in the loop except for the last repeat in the loop, and (ii) for updating the identification information to an instruction block executed after the repeat in the loop ends when the instruction block is executed in the last repeat in the loop.

With the configuration set forth above, the obfuscation device according to the first embodiment can obfuscate the set of original process instructions having a loop without any change in the execution result.

Furthermore, the same effect can be obtained when the first embodiment is implemented as a program, an integrated circuit, and a method.

The detailed description is hereafter provided.

First Embodiment

Figure 2:
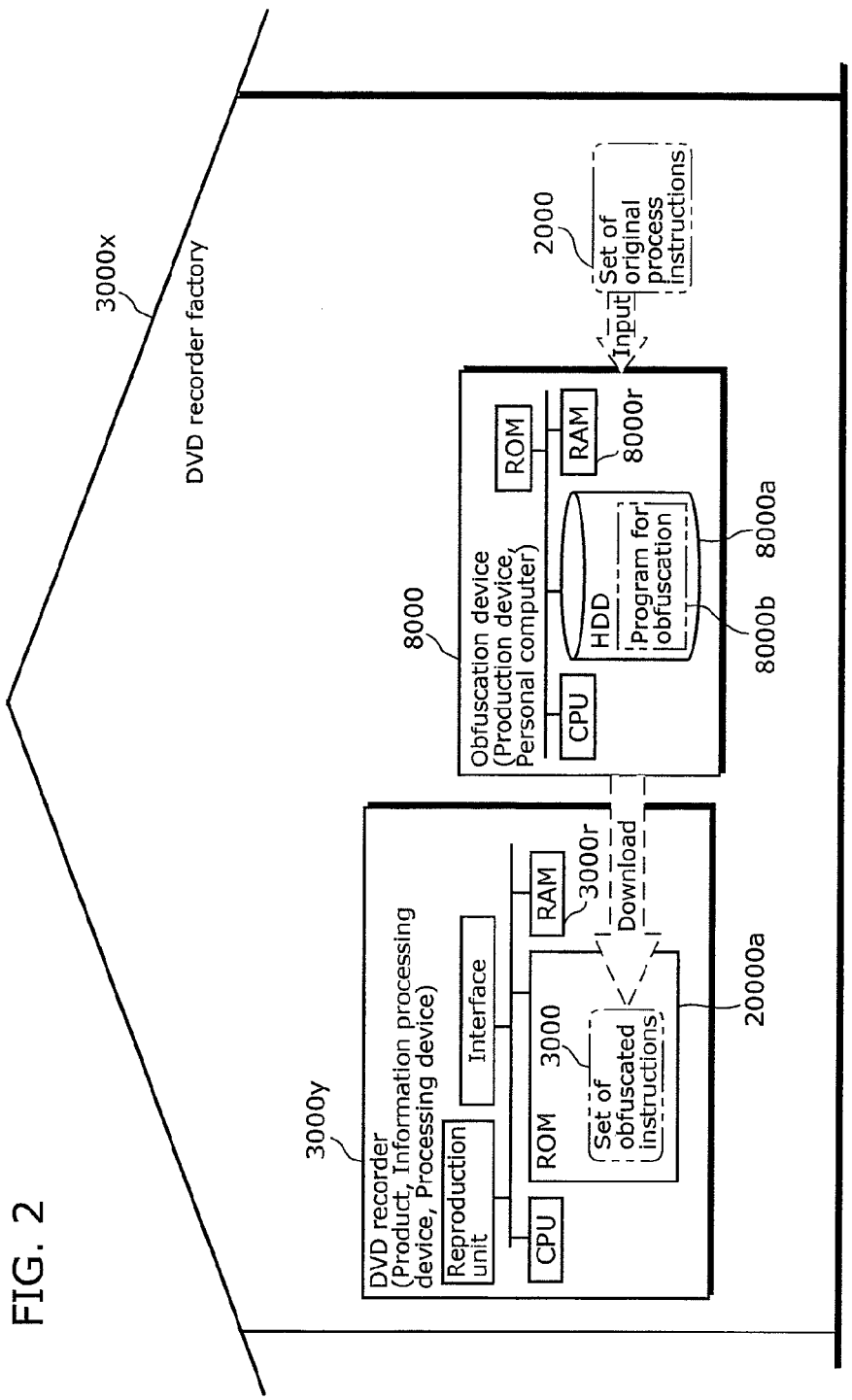
FIG. 2 shows a DVD recorder factory A.

FIG. 2 shows the DVD recorder factory 3000x.

The DVD recorder factory 3000x includes an obfuscation device 8000. The DVD recorder factory 3000x is a factory where the DVD recorder 3000y in which the set of obfuscated instructions 3000 which was transformed from the set of original process instructions 2000 by the obfuscation device 8000 is installed is manufactured.

The obfuscation device 8000 includes the storage medium 8000a. The storage medium 8000a stores the obfuscation program 8000b. The obfuscation device 8000 specifically is a general-purpose computer such as a personal computer, for example. Specifically, the storage medium 8000a is a hard disk drive (HDD) provided in the obfuscation device 8000, for example.

The DVD recorder 3000y includes the storage medium 20000a. In the storage medium 20000a, the set of obfuscated instructions 3000 transformed from the set of original process instructions 2000 by the obfuscation device 8000 is downloaded to the storage medium 2000a by the obfuscation device 8000. The storage medium 20000a stores the downloaded set of obfuscated instructions 3000. Specifically, the storage medium 20000a is a Read Only Memory (ROM) provided in the DVD recorder 3000y, for example.

In the first embodiment, the set of obfuscated instructions 3000 (FIG. 2) transformed from the set of original process instructions 2000 having a control configuration with a loop (FIG. 2) such that the execution order of each block configuring the set of original process instructions 2000 can be masked, and the obfuscation device 8000 which performs the transformation shall be described.

<Description for the Sets of Instructions Before and After the Transformation>

First of all, the set of original process instructions 2000 (FIG. 2) which is to be used for the description as an example, and the set of obfuscated instructions 3000 which is obtained by transforming the set of original process instructions 2000 shall be described in the first embodiment. Note that, each of the set of original process instructions 2000 and the set of obfuscated instructions 3000 is a group of at least one instruction to the computer, and may be one or more programs, or a part of the unit configuring the program (a function, for example). The same applies to the other "set of instructions", "instructions", and "blocks" described in the present invention.

Figure 3:
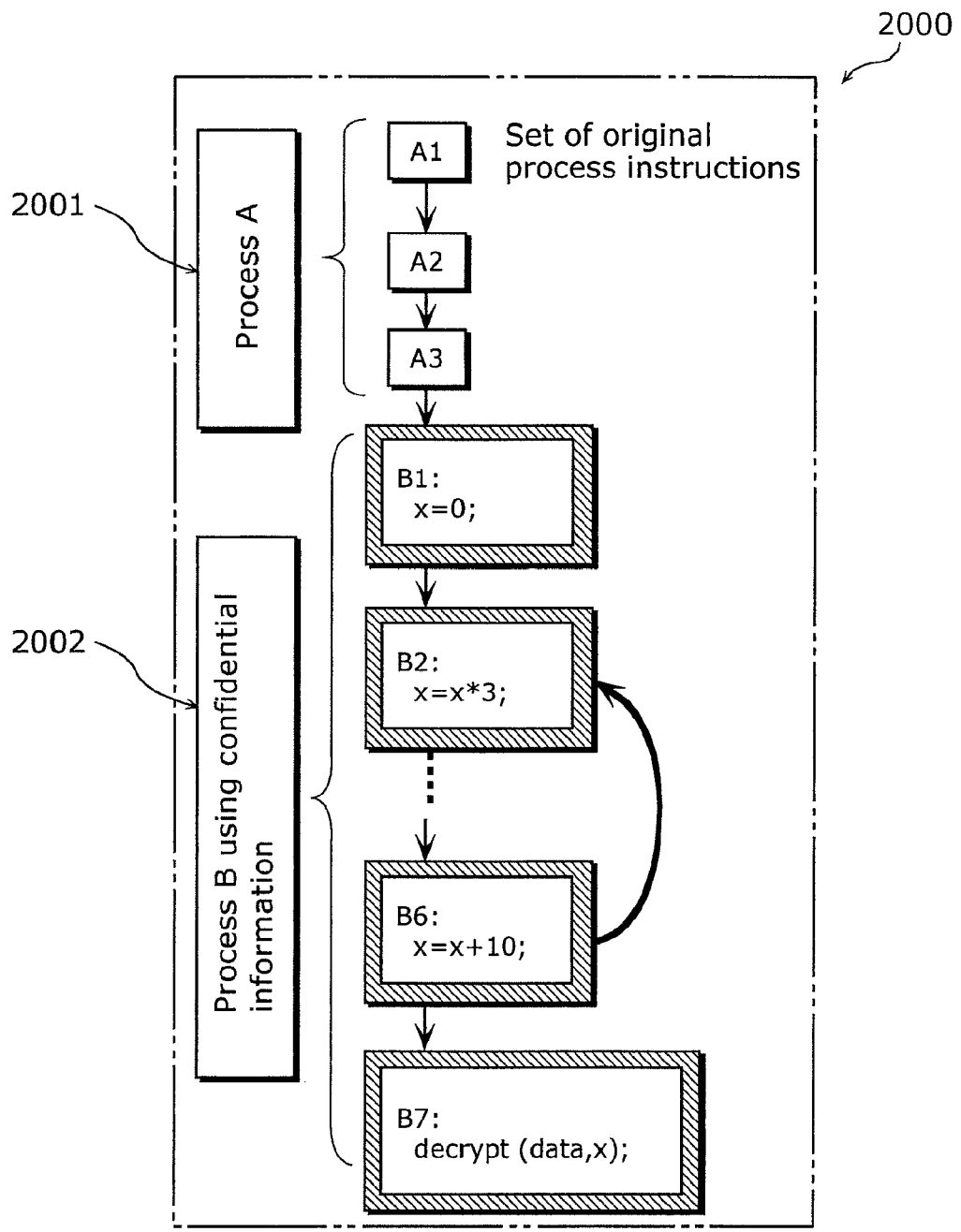
FIG. 3 shows an example of the set of original process instructions.

FIG. 3 shows an example of the set of original process instructions 2000. Note that the illustrated set of original process instructions 2000 is merely an example.

First of all, description for the set of original process instructions 2000 shall be made. In FIG. 3, the set of original process instructions 2000 is configured of the first set of instructions 2001 for performing a process A which does not use confidential information, and the second set of instructions 2002 which performs a process B which uses the confidential information. Here, the confidential information is the information which should be protected from unauthorized analysis, and description shall be made in the first embodiment for a key used for decrypting the data. The confidential information is, for example, information which causes disadvantage for the user of the DVD recorder 3000*y* (FIG. 3 and others) or the provider of the set of original process instructions 2000, or both of them when the confidential information is exposed to a third party other than the user.

In the set of original process instructions 2000, the process A is configured of a plurality of blocks (Blocks A1, A2, and A3) each of which is a group of at least one instruction. Furthermore, the process B is configured of blocks B1, B2 . . . B6, and B7, and includes a loop which repeats the process between B2 and B6 for a predetermined number of times (10 times, for example).

Here, the key which is the confidential information in the first embodiment is calculated by the DVD recorder 3000*y* using the variable x, and is used for decrypting the data in the block B7 (FIG. 3). Note that "decrypt (data, x);" in the block B7 indicates that the data is decrypted using the key x.

Note that the process A may be any process as long as it is independent of the process B. Although the process A is described as the process which does not use the confidential information in the description above, the process A may also include another confidential information.

Since the set of original process instructions 2000 includes a loop, the range where the first set of instructions 2001 for executing the process A and the second set of instructions 2002 for executing the process B are switched is limited. More specifically, in the execution order of the blocks included in the first set of instructions 2002, the execution order of the blocks inside the loop of the second set of instructions 2002 (block B2 to block B6), and the obfuscation device 8000 are not switched. The execution order of the blocks in the first set of instructions 2002 can be switched by the obfuscation device 8000 only in the execution order in the range which is not inside the loop. To put it differently, the range of the switched execution order of the blocks in the first set of instructions 2002 is limited to the range where it is not in the loop in the second set of instructions 2002. Thus, in the program including the first set of instructions 2002, the area occupied by the first set of instructions 2002 is relatively easily specified by the analyzer. Note that the program including the first set of instructions 2002 may be understood as, for example, the program configured with the set of original process instructions 2000 only, and may also be understood as the program configured with the set of original process instructions 2000 and other set of instructions. Thus, based on the specified area, the variable x which the first set of instructions 2002 uses for calculating the key and the key calculated using the variable x, are easily specified. Accordingly, it is highly likely that the value of the key x leaks by the unauthorized analysis. Note that the variable x is a variable used for calculating the key. The variable x is referred to as the key x when necessary.

Figure 4:
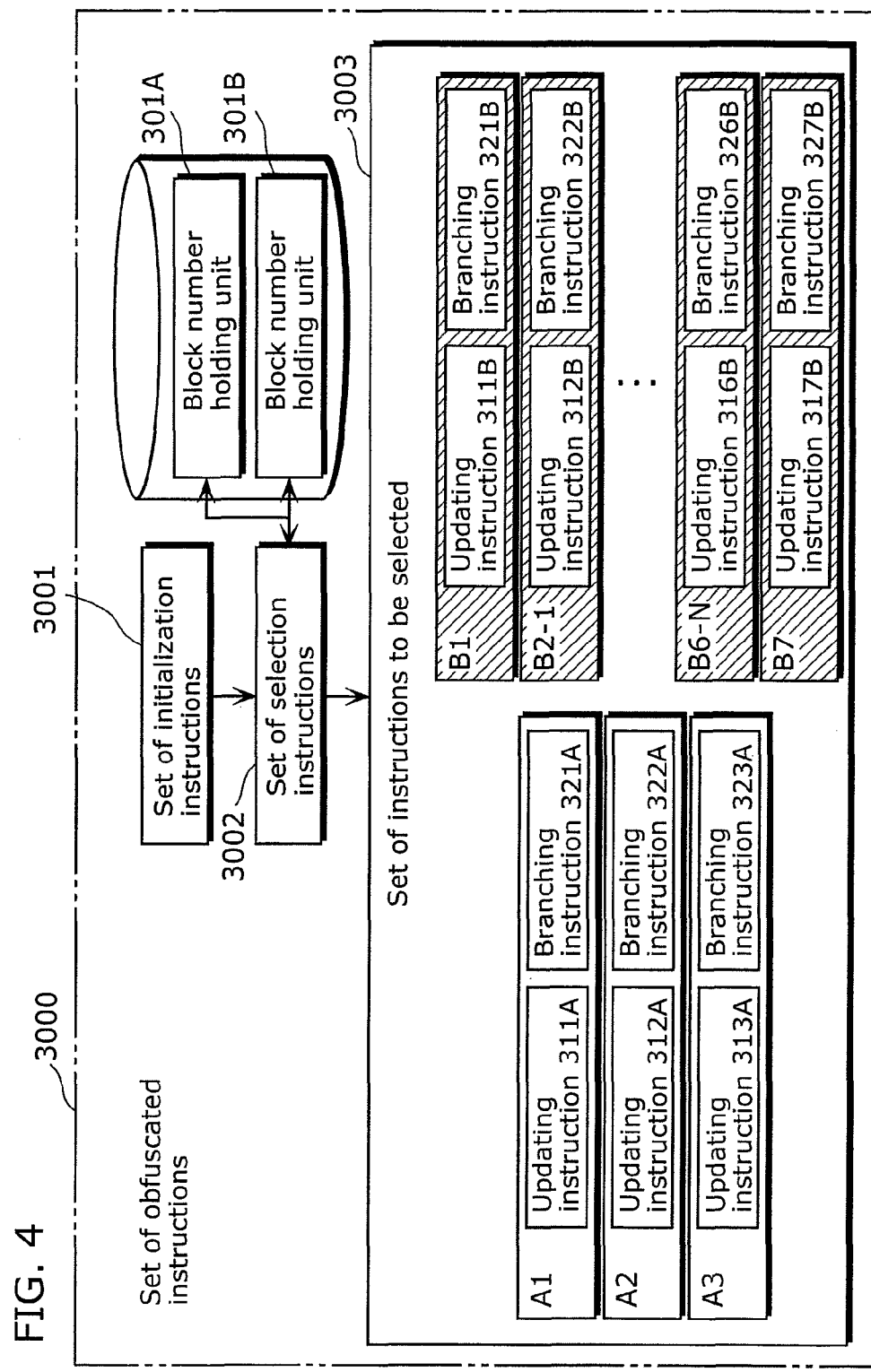
FIG. 4 shows an example of the set of obfuscated instructions.

FIG. 4 shows the configuration of the set of obfuscated instructions 3000 (FIG. 2).

Subsequently, the description for the set of obfuscated instructions 3000 which is obtained by transforming the set of original process instructions 2000 (FIGS. 2 and 3) using the method indicated in the first embodiment are described. FIG. 4 shows an example of the set of obfuscated instructions 3000 which is obtained by transforming the set of original process instructions 2000 shown in FIG. 3.

In the set of obfuscated instructions 3000 (FIG. 4), compared to the set of original process instructions 2000 (FIG. 3), the set of initialization instructions 3001 and the set of selection instructions 3002 are added. Furthermore, in each block configuring the first set of instructions 2001 in the set of original process instructions 2000 and in each block configuring the second set of instructions 2002, the updating instructions (the updating instruction 311A in FIG. 4, for example) and the branching instructions (the branching instruction 321A in FIG. 4 for example) are added. Furthermore, though not shown in the drawing, the block number which is identification information for identifying the block is assigned to each block. More specifically, assigning the block number means, for example, that the obfuscation device generates the block number for specifying the block out of the blocks in the program, and adds the generated block number to the content of the block.

Furthermore, the set of obfuscated instructions 3000 uses the block number holding unit 301A provided on the recording medium and the block number holding unit 301B. It is assumed that these block number holding units are implemented by securing the areas on the recording area by the set of obfuscated instructions 3000 itself. However, the block number holding units may also be secured on the recording medium in advance. Note that the recording medium where the block number holding units is, for example, a working memory or a hard disk.

Description for each element configuring the set of obfuscated instructions 3000 and the block number holding units (the block number holding unit 301A and the block number holding unit 301B) shall be made.

The block number holding unit 301A manages the progress of the process A by holding the block number of the block that the DVD recorder 3000*y* should executed next, out of each block implementing the process A. The block number to be held is updated every time the blocks implementing the process A (the block in the first set of instructions 2001, also hereafter referred to as the blocks in the process A) is executed, by the updating instruction added to the block (such as the updating instruction 311A in FIG. 4).

The block number holding unit 301 manages the progress of the process B by holding the block number of the block that should be executed next among the blocks implementing the process B. The block number being held is updated every time one of the blocks for implementing the process B (hereafter also referred to as the blocks in the process B) is executed, by the updating instruction added to the block.

The set of initialization instructions 3001 generates the block number holding unit 301A and the block number holding unit 301B on the recording medium. Furthermore, the set of initialization instructions 3001 sets the block numbers indicating the first blocks of the process A and the process B as the block numbers held by the respective block number holding units. In the example shown in FIG. 4, the block number of the block A1 is set on the block number holding unit 301A, and the block number of the block B1 is set on the block number holding unit 301B. Furthermore, the set of initialization instructions 3001 performs variable declaration and initialization of the variable used in the set of obfuscated instructions 3000. As to be described later, each of the blocks for implementing each process in the set of obfuscated instructions 3000 uses the blocks included in the set of original process instructions 2000. Thus, the variable declarations in the set of original process instructions 2000 can be used as the variable declarations in the set of initialization instructions 3001. However, when the variable which is not used in the set of obfuscated instructions has been know in advance, the variable declaration for the variable may be omitted. For example, in the first embodiment, the loop is expanded, as shall be described later. Accordingly, the variable declaration for the variable which counts the number of the repeat in the loop can be omitted. Furthermore, when the variable is initialized in any block in the set of original process instructions 2000, only the variable declaration may be performed in the set of initialization instructions 3001. Note that, it is also acceptable to declare the variable different from the variable included in the set of original process instructions 2000 and to use the variable instead of the variable included in the set of original process instructions 2000 as long as the process result does not change. Furthermore, the set of initialization instructions 3001 declares other variables used in the set of obfuscated instructions 3000 and initializes the declaration as necessary. An example of the variable includes the variable read from the block number holding unit, which stores the block number of the block to be executed next.

Note that the set of initialization instructions 3001 includes, for example, the first holding control unit which generates the block number holding unit 301A, and the second holding control unit which generates the block number holding unit 301B. More specifically, the first holding control units and others may include the area securing instruction such as the malloc instruction in the C language. It may also be understood that the block number holding unit 301A and the block number holding unit 301B are not included in the set of obfuscated instructions 3000, for example.

Note that the description that a part of the program (an instruction, a set of instructions, blocks and others) performs a specific function indicates that the function is described in the part. To put it differently, the part is the data specifying the function.

The set of selection instructions 3002 determines whether the process should be executed next is the process A or the process B. In the first embodiment, the process A and the process B are selected at random.

Furthermore, the set of selection instructions 3002 determines the block that should be executed next by referencing the block number to be held in the block number holding unit corresponding to the selected process. More specifically, the set of selection instructions 3002 selects the block having the number to be held by the block number holding unit 301A out of the blocks in the process A when the process A is selected. Furthermore, the set of selection instructions 3002 selects the block having the number to be held by the block number holding unit 301B out of the blocks in the process B when the process B is selected. Note that, when all of the blocks in the selected process have been executed, the set of selection instructions 3002 always selects the blocks in the other process. Furthermore, when all of the blocks in both processes have been executed, the set of selection instructions 3002 ends execution of the set of obfuscated instructions 3000.

Note that, in the first embodiment, when all of the blocks in the process corresponding to the block number holding unit have been executed, each block number holding unit records a value which indicates that the execution ended. The recorded value is, for example, 0 as shall be described in detail later. The set of selection instructions 3002 determines whether all of the blocks in each process have been executed or not by referencing the value.

The set of instructions to be selected 3003 is a group of the blocks in the process A and the blocks in the process B included in the set of original process instructions 2000. More specifically, the set of instructions to be selected 3003 is a set of instruction including the blocks in the first set of instructions 2001, and the second set of instructions 2002. However, the block number is assigned to each block in the set of instructions to be selected 300, and the updating instruction and the branching instructions are added as described above. Furthermore, when the set of original process instructions 2000 includes a loop (B2 to B6 in FIG. 3), the blocks are stored in the set of instructions to be selected 3003 with the loop expanded. More specifically, in the first embodiment, the blocks having the same configuration as the blocks B2 . . . B6 are stored in the set of instructions to be selected 3003 as many as the number of repeat on the loop. In the first embodiment, the number of repeat in the loop is denoted as N, and each of the blocks corresponding to each repeat is denoted as B2-1 . . . B2-B, B6-1 . . . B6-N. More specifically, the set of instructions to be selected 3003 includes the set of blocks as many as the number of the repeat in the loop (the block B2-t to the block B6-t, where $1 \leq t \leq$ the number of repeat). The block B2-t to the block B6-t respectively performs the process in the block 1 to the block 6 in the $t^{th}$ time in the loop. Subsequently, the group of blocks configured of the block B2-t to the block B6-t performs the process in $t^{th}$ time in each of the set of blocks.

The updating instruction added to each block is an instruction updating the block number holding unit corresponding to the process implemented by the added block (the first process or the second process, hereafter also referred to as the process to which each block belongs) The updating instruction updates the value held by the block number holding unit such that the updated block number holding unit indicates the block number of the block should be executed after the block, out of each block belonging to the same process to which the block where the updating instruction is added. For example, the block that should be executed next to the block A1 out of the blocks in the process A is the block A2. Thus, the updating instruction A311 (FIG. 4) added to the block A1 is an instruction updating the block number held by the block number holding unit 301A to "A2". Similarly, the updating instruction 312A added to the block A2 is an instruction for updating the block number held by the block number holding unit 301A to "A3". Note that the block A3 is the last block for implementing the process A, and there is no block that should be executed next. Accordingly, the updating instruction 313A added to the block A3 is an instruction for recording, in the block number holding unit 301A, the value indicating that all of the blocks for implementing the process A are executed by the DVD recorder 3000y.

The updating instruction added in each block of the process B basically performs the same process as the updating instruction added to the block in the process A. However, the process in the updating instruction in the process B is different from the process in the process A, since the block for implementing the process B includes a loop. As described above, the loop is expanded in the set of instructions to be selected 3003. For this reason, in the set of instructions to be selected 3003, there are the blocks B6 which are the last block in the loop as many as the repeat in the loop (more specifically, the block B6-1 . . . the block B6-N). In this case, in each block from the block B6-1 . . . the block B6-(N−1), the block that should be executed next to the block is the block B2-2 . . . the block B2-N which are the first block in the loop. More specifically, the block that should be executed next to the block B6-u is the block B2-(u+1) (where $1 \leq u \leq N-1$). Accordingly, the updating instruction added to each block described above (the block Bx-u, where $1 \leq x \leq 6$) updates the block number held by the block number holding unit 301B to "B2-2" . . . "B2-(N-1)" ("B2-(u+1, where $1 \leq u \leq N$). In contrast, the block B6-N is in the last of the repeat, the block that should be executed next is the block B7 which is a block that should be executed after the repeat by the loop ends. Accordingly, the updating instruction added to the block B6-N updates the block number held by the block number holding unit 301 to "B7". Other than the process related to the loop, the process performed by the updating instruction is identical to the process by the updating instruction added to the blocks for implementing the process A.

Note that the updating instruction may update the block number being held to the appropriate block number after the update by the known technology. For example, the known technology to be used is the technology related to the technology for expanding the loop.

The branching instructions added to each block is the branching instruction with which the process performed by the DVD recorder 3000y jumps to the set of selection instructions 3002 as the set of instruction that the DVD recorder 3000y should execute next. In the first embodiment, the branching instructions which indicate the same part in the sections among the set of selection instructions in the jump destination for each block are added. Note that the branching instruction is executed after the abovementioned updating instruction is executed. Furthermore, since the branching instruction added to each block jumps to the same destination, the branching instruction may also be implemented as one instruction executed after the execution of the blocks, instead of adding the branching instruction to each block.

Furthermore, one or both of the updating instruction and the branching instruction in the first embodiment may be a single instruction. Additionally, one or both of the instructions may be configured as a group of the plurality of instructions.

<Description for the Operation of the Set of Obfuscated Instructions 3000>

Figure 5:
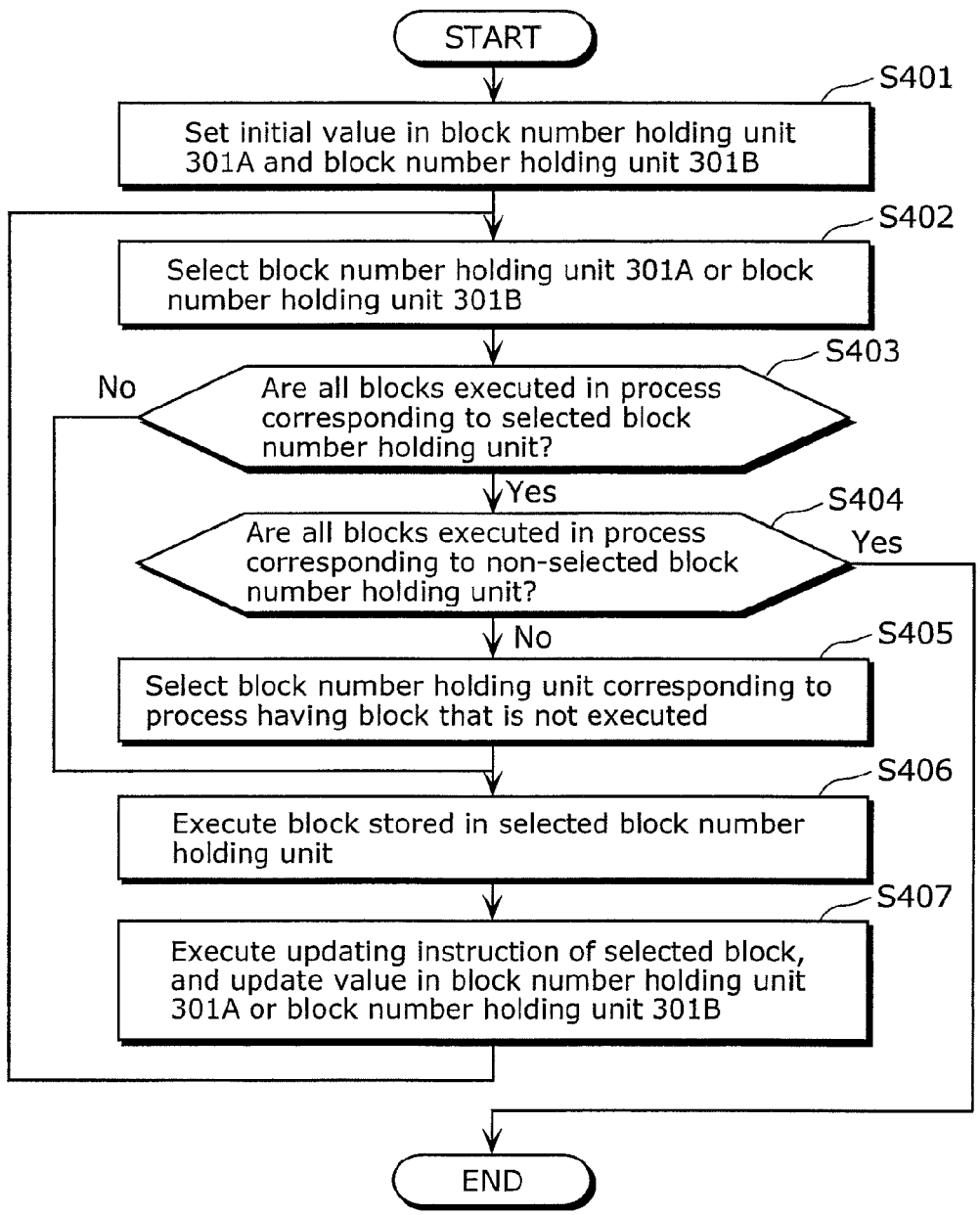
FIG. 5 is a flowchart indicating the operations of the set of obfuscated instructions.

FIG. 5 is a flowchart of the process performed by the set of obfuscated instructions 3000 shown in FIG. 4.

Subsequently, the operations of the DVD recorder 3000y which executes the set of obfuscated instructions 3000 shall be described. FIG. 5 shows the operations of the DVD recorder 3000y which executes the set of obfuscated instructions 3000. Note that the set of obfuscated instructions 3000 performs the specific process indicates that the DVD recorder 3000y which executes the set of obfuscated instructions 3000 performs the process.

In step S401, the set of obfuscated instructions 3000 first sets the initial value on the block number holding unit 301A and the block number holding unit 301B with the set of initialization instructions 3001. Furthermore, the set of initialization instructions 3001 declares the variable used by the set of obfuscated instructions 3000 and the initialization of the variable as necessary. In the first embodiment, "A1" is recorded on the block number holding unit 301A, "B1" is recorded on the block number holding unit 301B by the set of initialization instructions.

In step S402, subsequent to the step S401 described above, the set of selection instructions 3002 determines whether the process A or the process B proceeds at random. More specifically, the set of selection instructions 3002 determines whether the block number holding unit 301A or the block number holding unit 302B is referenced at random.

In step S403, it is determined whether or not the value indicating that all of the blocks corresponding to the block holding unit have been executed in the set of selection instructions 3002 and the block number holding unit which was selected by the set of selection instructions 3002 is held.

In step S404, the set of selection instructions 3002 checks the other block number holding unit, when it is determined that the value indicating the execution is done in the abovementioned step S403 (Yes in step S403). Here, the other block number holding unit indicates the other of the block number holding unit selected in step S402 out of the block number holding unit 301A and the block number holding unit 301B. In step S404, the set of selection instructions 3002 determines whether the value held in the block number holding unit is also the value indicating that all of the blocks have been executed.

In step S405, when the other block number holding unit that has been checked (determined) in step S404 does not hold the value indicating all of the blocks corresponding to the block number holding unit have been executed, the set of selection instructions 3002 reselects the other block number holding unit as the block number holding unit to be referenced (No in step S404).

Note that it is determined in step S403 that the other block number holding unit does not hold the value indicating that all of the blocks have been executed (No in step S403), the selection of the block number holding unit to be referenced does not change. More specifically, when it is determined in step S403 that the value all of the blocks have been executed is not held, the set of selection instructions 3002 does not execute step S405.

As described above, with the process in steps S401 to S405, one of the block number holding unit 301A and the block number holding unit 301B is selected in step S402 or step S405.

In step S406, the block indicated by the block number recorded on the block number holding unit selected by the process in steps S401 to S405 is executed by the DVD recorder 3000y (step S406). More specifically, the set of selection instructions 3002 causes the DVD recorder 3000y to execute the block specified by the selected block number holding unit.

Note that, in the step S404, when it is determined that both of the block number holding units hold the values indicating that all of the blocks are executed (Yes in step S404), the execution of all of the blocks in the program is completed. Thus, the set of obfuscated instructions ends the process shown in FIG. 5.

In step S407, when the process in the block execution of which is indicated by the set of selection instructions 3002 in step S406 is completed, the value of the block number holding unit 301A or the block number holding unit 301B with the updating instruction in the block is updated (step S407).

Subsequently, the executed process returns to step s402 with the branching instruction in the block.

<Specific Example>

Figure 6:
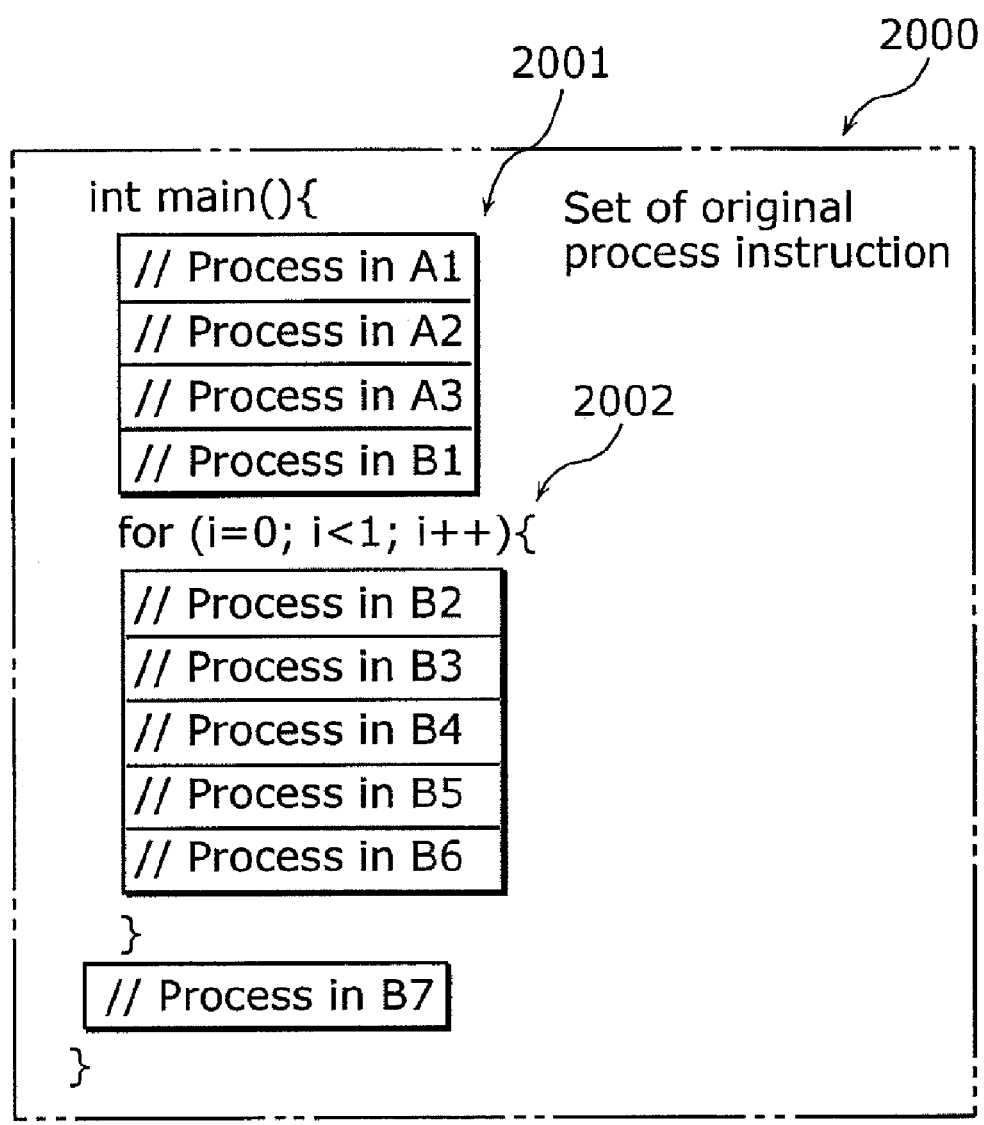
FIG. 6 shows a specific example of the set of original process instructions.

FIG. 6 shows the configuration of the set of obfuscated instructions 2000 (FIG. 2). FIG. 6 shows a specific example of the set of original process instructions 2000 described in the C language. Note that the description for the details or each block in FIG. 6 is omitted as necessary. Furthermore, for the simplicity of the explanation, the repeat of the process in the loop from the block B1 to the block B6 is assumed as twice. As shown in FIG. 6, in the set of original process instructions 2000, each of the instruction blocks (the process in the first set of instructions 2001 and the process in the second set of instructions 2002) are executed in the execution order shown in the abovementioned FIG. 1. More specifically, the set of instruction which includes the loop (the second set of instructions 2002) is executed after the other set of instructions (the first set of instructions 2001).

Figure 7:
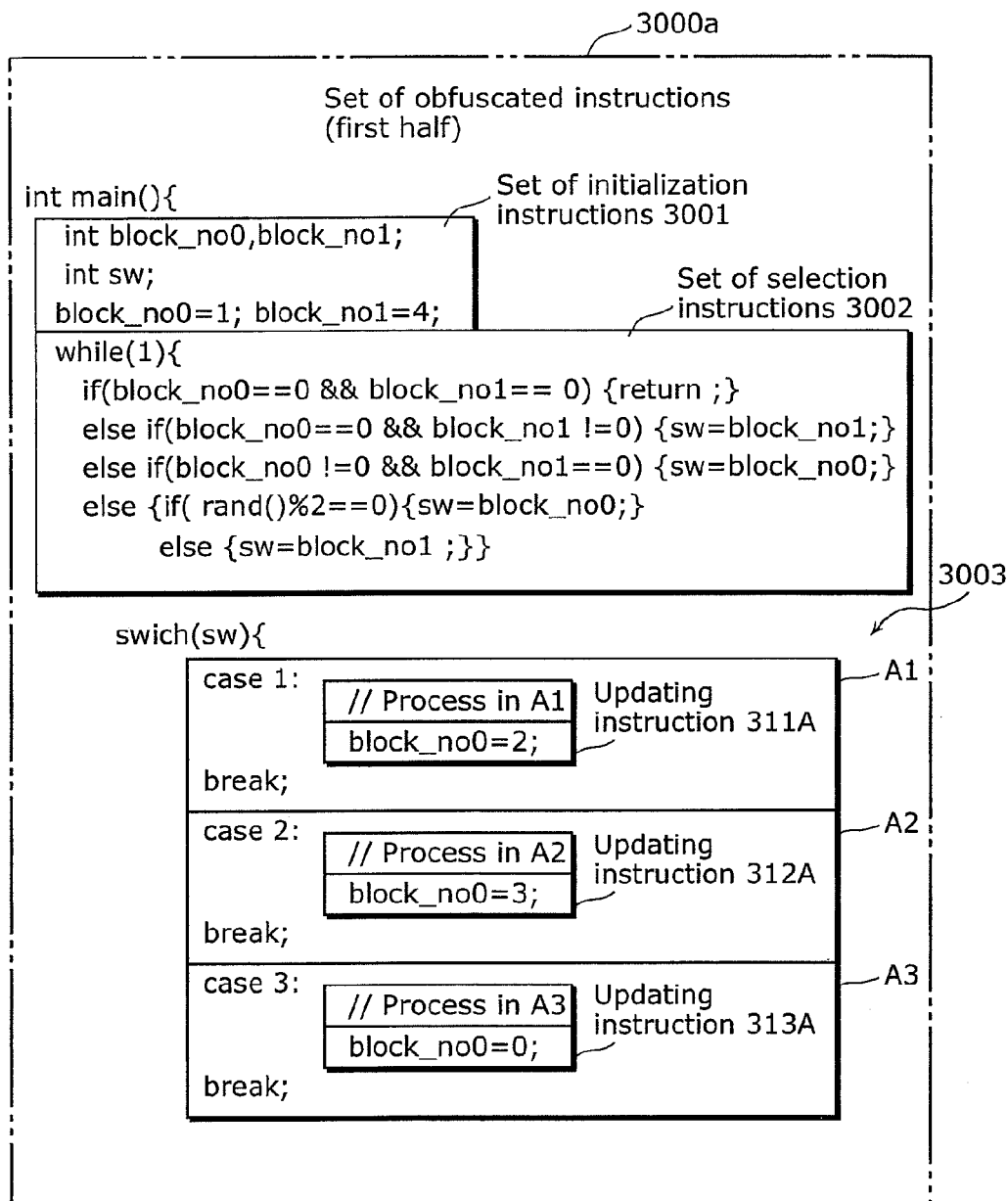
FIG. 7 shows a specific example of the set of obfuscated instructions.

FIG. 7 shows the configuration of the first half 3000a of the set of obfuscated instructions 3000 shown in FIG. 5.

Figure 8:
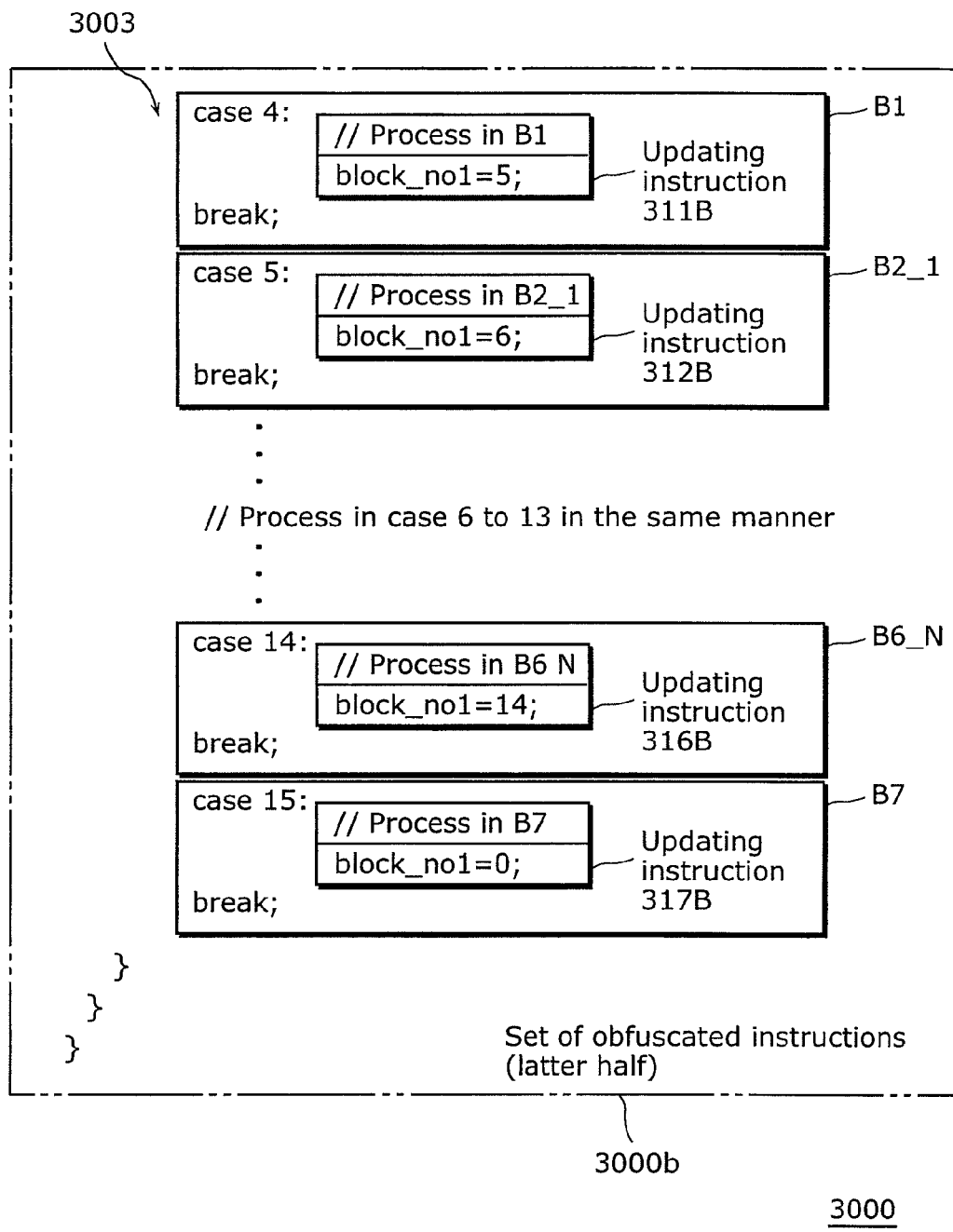
FIG. 8 shows a specific example of the set of obfuscated instructions.

FIG. 8 shows the configuration of the latter half 3000b of the set of obfuscated instructions 3000 shown in FIG. 5.

The specific example of the set of obfuscated instructions 3000 which is obtained by transforming the set of original process instructions 2000 shown in FIG. 6 is the program shown in FIG. 7 and FIG. 8. The description for the specific example shown in FIG. 7 and FIG. 8 shall be hereafter described.

In the set of initialization instructions 3001 (see FIG. 4), each block number holding unit (the block number holding unit 301A and the block number holding unit 301B) is generated by declaring the variable block_no0 and the variable block_no1. Here, the variable block_no0 is the variable for managing the progress of the process A, and holds the block number of the block that should be executed next in the process A. On the other hand, the variable block_no1 is the variable for managing the progress of the process B, and holds the block number of the block that should be executed next in the process B. Note that the abovementioned first holding control unit may be understood as including "int block_no0, block_no1;" which declares the variable block_no0, for example. Furthermore, the second holding control unit may also be understood as including the "int . . . ". Furthermore, the first holding control unit may be understood as including the part which declares the variable block_no0 in a machine language program where "int block_no0, block_no1;" is compiled.

Furthermore, the set of initialization instructions 3001 declares the variable sw. The block number of the block that should be executed next by the DVD recorder 3000y is stored in the variable sw.

Here, the block number is a number for specifying the block having the block number from among each block in the first set of instructions 2001 and each block in the second set of instructions 2002. More specifically, the block number specifies whether the set of instructions where the block having the block number is the first set of instructions 2001 or the second set of instructions 2002, and specifies which block it is among the blocks in the set of instruction. Specifically, when the block having the block number is the block in the set of instructions 2001, the block number is the order of the block in the blocks in the first set of instructions 2001. Accordingly, the block numbers of the block A1, the block A2 . . . in FIG. 6 are respectively, 1, 2, and 3. Furthermore, when the block having the block number is the block in the second set of instructions 2002, the block number is the number where the order of the block in the blocks of the second set of instructions 2002 is added to the total number of the blocks in the first set of instructions 2001 (3 shown in FIG. 6). Accordingly, the block numbers of the block B1 and the block B2 are, for example, 3+1=4, and 3+2=5 . . . .

Furthermore, in this specific example, the set of initialization instructions 3001 substitutes the initial values "1" and "4" to each variable, the variable block_no0 and the variable block_no1. Here, the initial values "1" and "4" are the block number of the first block in the first set of instructions 2001 and the block number of the first block in the second set of instructions 2002, respectively. In this specific example, the set of selection instructions 3002 uses the same variable sw for both the process A and the process B in the branching of the process in the set of selection instructions 3002. Accordingly, it is necessary to perform the initialization with number having a difference more than "3" which is the number of the blocks belonging to the process A such that the values of the variable block_no0 and the variable block_no1 do not overlap. Note that the block number in the specific example is the value used for selecting the block by the case instruction in the C language in the set of instructions to be selected 3003 which shall be described later. The case instruction is an instruction for selecting the block specified by the variable sw as the block which is to be executed next and for executing the selected block. In this specific example, the process proceeds by storing the block number of the block which should be executed next in the variable sw, and executing the block corresponding to the block number by the DVD recorder 3000y.

Note that, in this specific example, the details of each block are omitted for the purpose of explanation. More specifically, specific examples for the variable declaration and the initialization instruction in the set of initialization instructions 3001 are omitted as necessary.

The set of selection instructions 3002 selects the block which is executed next based on the values of the variable block_no0 and the variable block_no1, and store the identifier (block number) of the selected block to be selected in the variable sw. More specifically, there are four operations of the set of selection instructions 3002 according to the values of block_no.

(1) When both block_no0 and when block_no1 are 0, more specifically, when the execution of both of the last block in the process A and the last block in the process B have ended, the set of selection instructions 3002 ends the execution of the set of obfuscated instructions 3000 with the "return" statement.

(2) When block_no0 is 0, and when block_no1 is not 0, the set of selection instructions 3002 selects the block in the process B, more specifically, when all of the blocks in the process A is executed, and when the execution of the blocks in the process B does not end, the set of selection instructions 3002 selects the block in the process B. More specifically, the set of selection instructions 3002 stores, in the variable sw, the identifier of the block that is executed next out of the blocks in the process B stored in block_no1.

(3) When block_no0 is not 0, and when block_no1 is 0, more specifically, when the execution of the process A does not end and when the execution of all of the blocks in the process B has ended, the set of selection instructions 3002 selects the blocks in the process A. More specifically, in this case, the set of selection instructions 3002 stores, in the variable sw, the identifier of the block that is executed next in the process A stored in block_no0.

(4) When block_no0 is not 0, and when block_no01 is not zero, more specifically, when the execution of the last block in both the process A and the process B do not end, the set of selection instructions 3002 selects whether the process that should proceed next is the process A or the process B at random, and proceeds the process. Here, it is assumed that the set of selection instructions 3002 generates the random number "rand( )", and the process A proceeds when the remainder of the random number divided by 2 is 0, and the process B proceeds when the remainder is 1. Accordingly, the value of block_no0 is substituted to the variable sw by the set of selection instructions 3002 when the remainder is 0, and the value of block_no1 is substituted to the variable sw by the set of selection instructions 3002 when the remainder is not 0.

The set of instructions to be selected 3003 is configured of the blocks transformed from the blocks configuring the set of original process instructions 2000. The block number is substituted in each block, and the block having the variable sw the value of which matches the block number is executed. Furthermore, each block includes the updating instruction which updates the variable block_no corresponding to the block such that the block that should be executed next, out of the blocks in the process to which the block belongs to is indicated. However, in the block that is executed last among the processes, the value "0" indicating that the execution of all of the blocks has been completed is substituted to the corresponding variable block_no with the updating instruction.

Note that, in this specific example, the loop by "while (1)" shown in FIG. 7, substitutes the branching instructions 321A to 323A and the branching instructions 321B to 327B. Accordingly, as shown in FIG. 7 and FIG. 8, there is no branching instruction in each block in the set of instructions to be selected 3003 in the set of obfuscated instructions 3000. Furthermore, regarding the blocks B2 to B6 configuring the loop, the loop is expanded as described above. In this specific example, the number of repeat N in the loop is 2. Accordingly, the total number of the blocks belonging to the process B is B1+(B2 to B6)×2+B7 equals to 12.

The description for the specific example of the sets of process instructions (the set of original process instructions 2000, the set of obfuscated instructions 3000) before and after the transformation according to the first embodiment has been described supra.

<Explanation for the Obfuscation Device>

Figure 9:
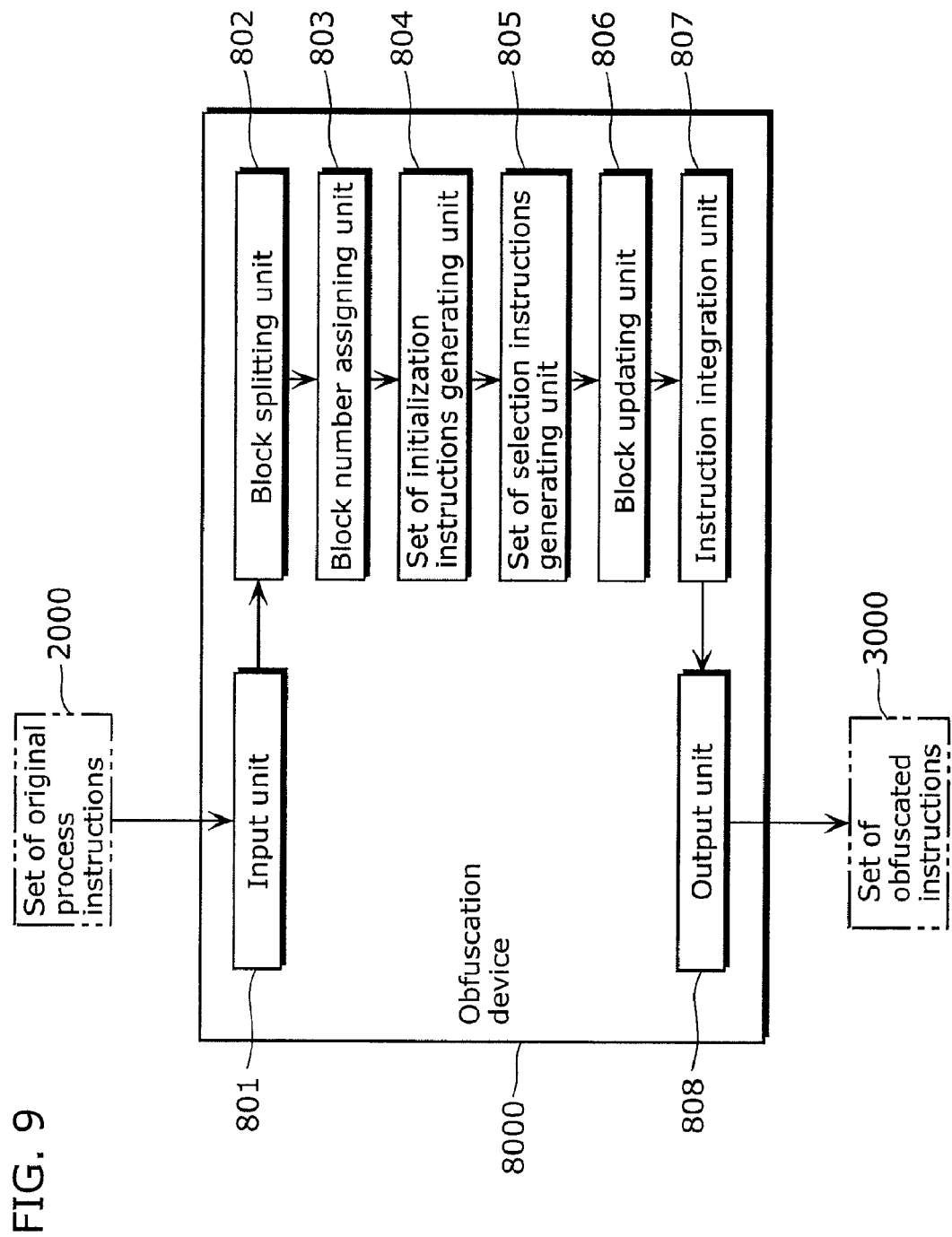
FIG. 9 shows the structure of the obfuscation device.

FIG. 9 shows the configuration of the obfuscation device 8000.

Subsequently, the obfuscation device 8000 which transforms the set of original process instructions 2000 to generate the set of obfuscated instructions 3000 is explained (See FIG. 2). The obfuscation device 8000 includes the input unit 801, the block splitting unit 802, the block number assigning unit 803, the set of initialization instructions generating unit 804, the set of selection instructions generating unit 805, the block updating unit 806, the instruction integration unit 807 and the output unit 808. Each component shall be described hereafter.

The input unit 801 receives the input of the set of original process instructions 2000 via the recording medium outside the obfuscation device 8000 and the network. Note that the input unit 801 may receive the input from the set of original process instructions 2000 from other components in the obfuscation device 8000 instead of outside when, for example, the set of original process instructions 2000 is held in the obfuscation device 8000.

The block splitting unit 802 splits the set of original process instructions 2000 inputted by the input unit 801 and generates each block. Here, the block splitting unit 802 generates the block, for the blocks included in the loop, with the loop expanded. More specifically, the input unit 801 generates the blocks as many as the number of repeat in the loop to which the same content is copied (block B2-t to block B6-t shown in FIG. 4, where 1≦t≦the number of repeat). Furthermore, the block splitting unit 802 classifies the blocks according to the process which blocks belong to, when generating the blocks, and obtains the number of classifications (more specifically, the number of processes included in the set of original process instructions 2000. In the first embodiment, each block is classified into the process A or the process B. Thus, the number of classification is "2". Furthermore, the block splitting unit 802 generates the execution order information indicating the execution order in each classification in each generated block.

Note that, in the first embodiment, the user provides the obfuscation device 8000 with information indicating how to split the blocks and classify the blocks, and the obfuscation device 8000 splits and classifies the set of original process instructions 2000 according to the information. Furthermore, the user may provide the obfuscation device 8000 with hints for the split and the classification, instead of giving the information manually. In the first embodiment, for example, the information indicating that the block which includes the variable x is determined to be a block belonging to the process A, and other blocks are the blocks belonging to the process B may be provided. Furthermore, the set of original process instructions 2000 may be automatically split using the know method for splitting a program into blocks, without relying on the input from the user. Note that the classification of the blocks may also be classified without relying on the input by the user. For example, the blocks with the same variable may be classified as a block implementing the same process.

In summary, the block splitting unit 802 specifies the first set of instructions 2001 out of the parts included in the set of original process instructions 2000. Furthermore, the block splitting unit 802 specifies the second set of instructions 2002 out of each part. Furthermore, the block splitting unit 802 specifies each block included in the first set of instructions 2001 out of each part of the first set of instructions 2001. Furthermore, the block splitting unit 802 specifies each block included in the second set of instructions 2002 out of each part in the first set of instructions 2002. Subsequently, the block splitting unit 802 specifies the order of the block in each block included in the set of instructions (the first set of instructions 2001 or the second set of instructions 2002). Afterwards, the block splitting unit 802 processes the block, based on which set of instructions the block is included and the order of the specified block. Furthermore, the block splitting unit 802 expands blocks configuring one loop (the block B2 to the block B6 in FIG. 6). With the process described above, the block splitting unit 802 generates expanded blocks after expansion as the part of the set of obfuscated instructions 3000 corresponding to the blocks (the block B2-t to the block B6-t in FIG. 4, where 1≦t≦the number of repeat).

The block number assigning unit 803 assigns, for each block generated by the block splitting unit 802 the block number for identifying the block. Note that the block number may be assigned arbitrarily as long as each block can be identified. Furthermore, although it is referred to as the "block number" in the first embodiments, the block number may be information composed of characters other then the numbers only.

The set of initialization instructions generating unit 804 generates the set of initialization instructions 3001 (FIG. 4, FIG. 7). More specifically, the set of initialization instructions generating unit 804 generates instructions for creating the block number holding unit as many as the number of classifications obtained by the block splitting unit 802 (two in the first embodiment). Furthermore, the set of initialization instructions generating unit 804 generates in each block number holding unit, an instruction for recording the block number assigned to the first block belonging to each process (see the first holding control unit and the second holding control unit described above). Furthermore, the set of initialization instructions generating unit 804 declares each variable and generates initialization instruction both used in the set of obfuscated instructions 3000. The variable declaration and the initialization instruction in the set of original process instructions 2000 is used for the variable declaration and the initialization instruction. Furthermore, when there is a variable that is not included in the set of original process instructions but that is used in the set of obfuscated instructions 3000, the variable declaration and the initialization instruction for the variable will be generated. The specific example of such instruction includes the variable "sw" shown in FIGS. 7 and 8. Subsequently, the set of initialization instructions generating unit 804 sets the set of instructions generated by integrating those generated instructions as the set of initialization instructions 3001.

The set of initialization instructions generating unit 805 generates the set of initialization instructions 3002 (FIG. 4, FIG. 7). More specifically, the set of selection instructions generating unit 805 generates a branching instruction for selecting one of the block number holding units generated by the set of initialization instructions 3001 at random. Here the number of branching is identical to the number of classifications.

The block updating unit 806 adds the updating instruction and the branching instruction for each block. More specifically, the block updating unit 806 generates the instruction for writing, to the block number holding unit corresponding to the block, the block number indicating the block to be executed next to the block, and makes it as the updating instruction. Furthermore, the block updating unit 806 generates a branching instruction in the set of selection instructions 3002, and makes it the branching instruction. Furthermore, the block updating unit 806 adds the generated updating instruction and the branching instruction for each block.

The instruction integration unit 807 integrates the updating instruction, the branching instruction, each block added with the block number, the generated set of initialization instructions 3001 and the set of selection instructions 3002 to conform to the format of the language describing the set of obfuscated instructions 3000, and generates the integrated set of instructions as the set of obfuscated instructions 3000.

The output unit 808 outputs the generated set of obfuscated instructions 3000.

<Explanation for the Operation of the Obfuscation Device>

Subsequently, the operations of the obfuscation device 8000 shall be described.

Figure 10:
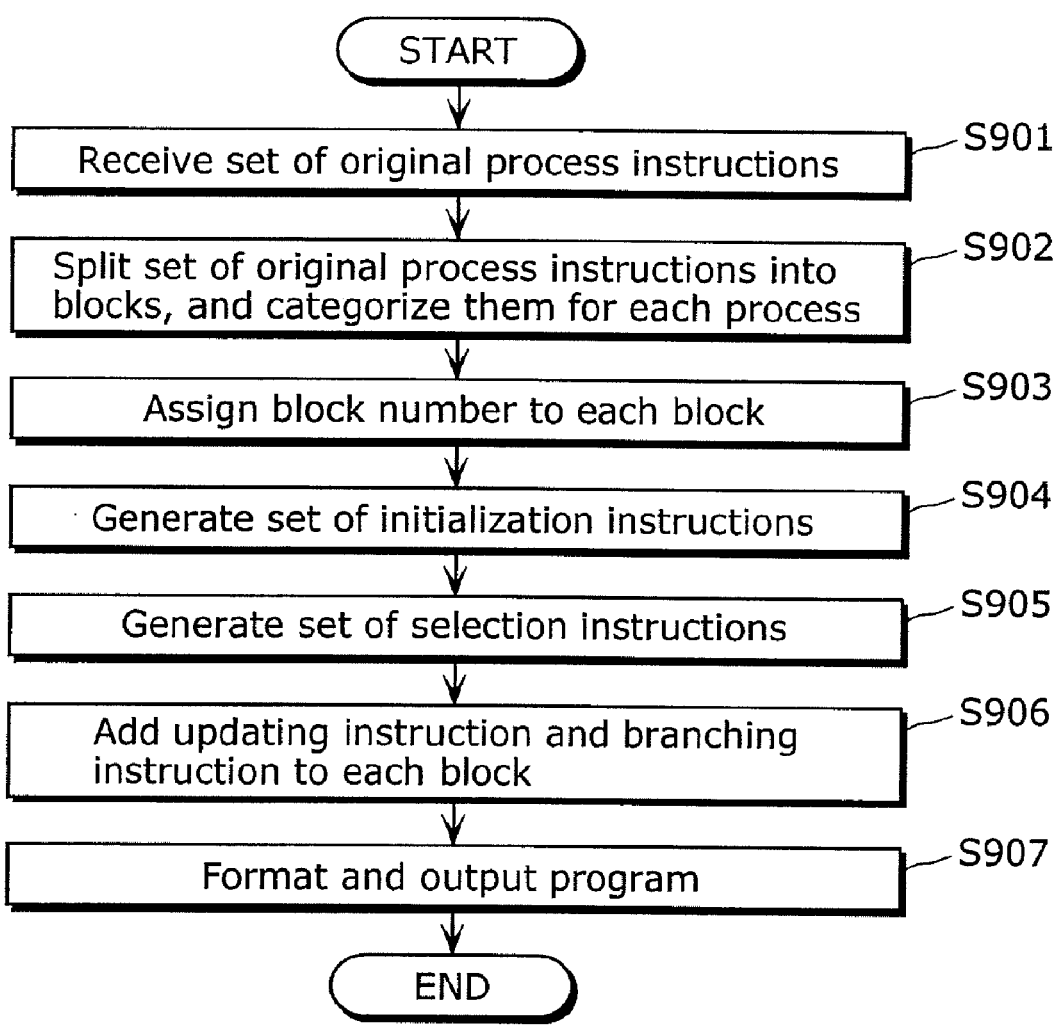
FIG. 10 is a flowchart showing the operations by the obfuscation device.

FIG. 10 is a flowchart showing the operations of the obfuscation device 8000.

In step S901, the obfuscation device 8000 first receives the set of original process instructions 2000 by the input unit 801.

Next, in step S902, the obfuscation device 8000 splits the set of original process instructions 2000 received by the block splitting unit 802 in step S901 into each block, and classifies each block.

In step S903, the obfuscation device 8000 assigns the block number to each block split in the step S902 by the block number assigning unit 803.

In step S904, the set of initialization instructions generating unit 804 generates the set of initialization instructions based on the block number assigned in step S903, and the number of classifications specified in the step S902. More specifically, the set of initialization instructions generating unit 804 generates the instruction for generating the block number holding unit as many as the classification, and the instruction for storing, in the block number holding unit, the block number of the block which is executed first in each classification, and make these instructions as the set of initialization instructions 3001.

In step S905, subsequently, the set of selection instructions generating unit 805 generates the set of selection instructions 3002. More specifically, the set of selection instructions generating unit 805 generates the set of instructions for randomly selecting the block number holding unit, and make the generated set of instructions as the set of selection instructions 3002.

In step S906, the block updating unit 806 generates the updating instructions and the branching instructions for each block and adds the updating instructions and the branching instructions for each block. Here, the added updating instruction is an instruction which belongs to the classification of each of the blocks, and is an instruction for recording, in the block number holding unit corresponding to the classification, the block number indicating the block to be executed next to the block. Furthermore, the added branching instruction is an instruction branching to the set of selection instructions 3002.

In step S907, the instruction integration unit 807 integrates each block generated by the block splitting unit 802, the set of initialization instructions 3001, and the set of selection instructions 3002 according to the format of the programming language being used, and generates the set of obfuscated instructions 3000. Furthermore, the output unit 808 outputs the generated set of obfuscated instructions. Note that a part of the block generated by the block splitting unit 802 is blocks after expansion where the blocks in the loop are expanded (the block B2-t to the block B6-t shown in FIG. 4, where $1 \leq t \leq$ the number of repeat).

The explanation of the first embodiments ends here; however, the present invention is not limited to the description above. The present invention includes a variation described below.

Although the confidential information is described as a key used for decrypting data in the first embodiment, the confidential information is not limited to this. The confidential information is not limited to this, but may also be information used for authentication with another device, information indicating usage right of content data such as a movie, a variable used for conditional branching, or a flag which switches between on/off of the function to be provided to the user. More specifically, the confidential information may be any information which needs to be hidden from an unauthorized analyzer for the reasons such as being disadvantageous to the provider of the set of original process instructions 2000 when leaked.

<Effect of the First Embodiment>

In the first embodiment, the obfuscation device 8000 obfuscates the set of original process instructions 2000 which includes in the loop. More specifically, the block number holding units which manage the progress of each process implemented by the set of original process instructions 2000 are provided, and individual management of the progress of the process and which process should be executed is implemented by the selection of the block number holding unit. With this, even when the set of original process instructions 2000 has a complex control configuration including the loop, it is possible to appropriately grasp the progress of each process and to switch the execution order of each block. Therefore, this allows switching of the order in a wider range, compared to the conventional technology.

Second Embodiment

The second embodiment of the present invention shall be hereafter described. In the second embodiment, a set of obfuscated instructions transformed from a set of original process instructions including a loop or a branch, which is transformed in such a manner that an attack targeting the branch can be prevented, and an obfuscation device which performs the transformation are described.

<Explanation for Execution Log Differential Attack>

The execution log differential attack which is envisioned in the second embodiment shall be explained with reference to FIG. 11 and FIG. 12.

Figure 11:
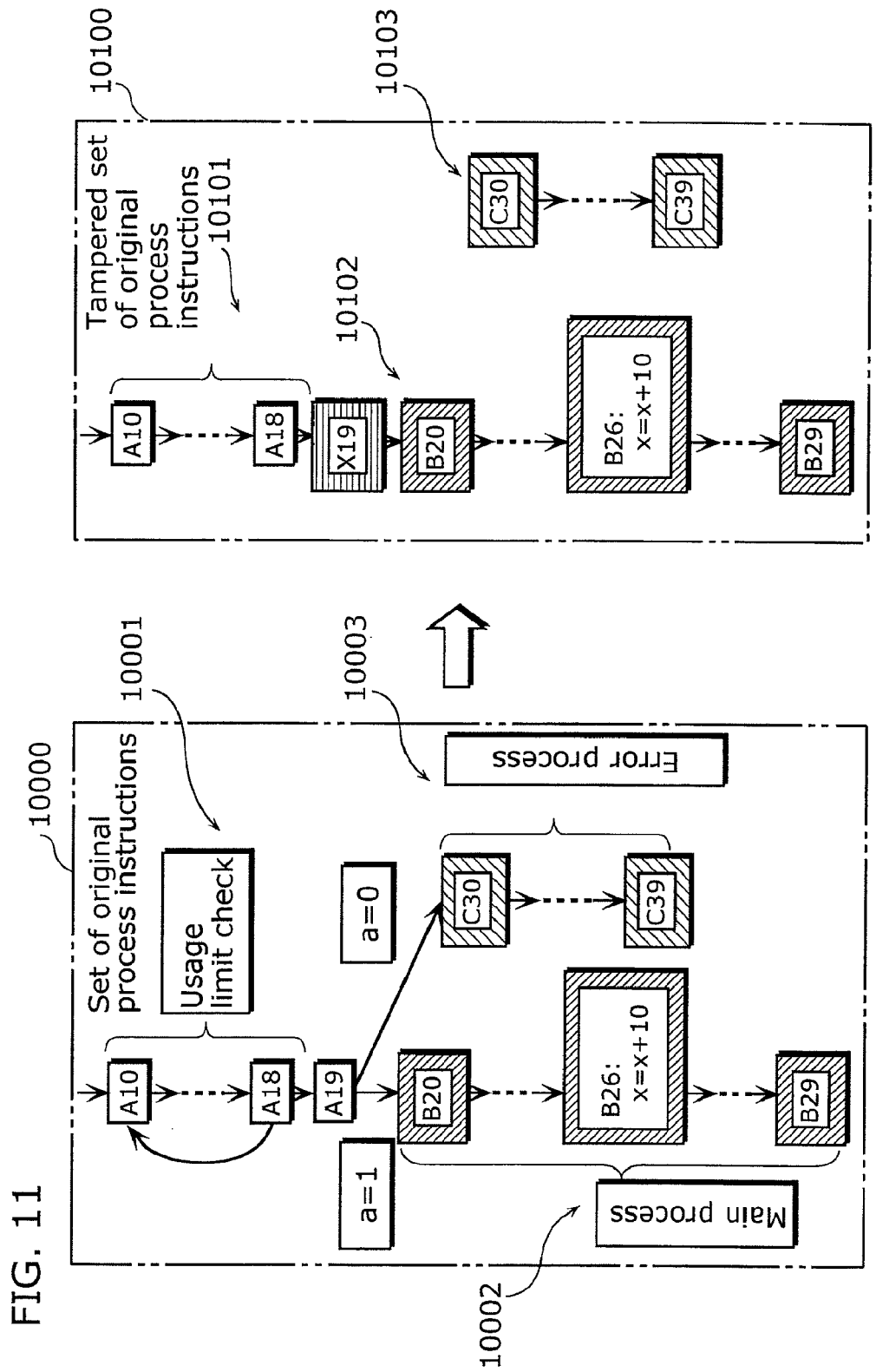
FIG. 11 shows an example of the program before and after the execution log differential attack.

FIG. 11 shows the set of original process instructions 10000 and the tampered set of original process instructions 10100, which is a tampered set of original process instructions 10000.

The diagram on the left of FIG. 11 is a block diagram indicating the set of original process instructions which is a program including a loop or a branch. Here, the set of original process instructions 10000 is a set of process instructions including at least one process instructions as in the set of original process instructions 2000 (FIG. 3 and others) in the first embodiment. The set of original process instructions 10000 includes the block B20 to the block B29 which implement the main process of the service, the block A10 to the block A19 which implement the usage limit check, and the block C30 to the block C39 which implements the error process. Note that, the block A10 to the block A19, the block B20 to the block B29, the block C30 to the block C39 are respectively the instructions configuring the set of original process instructions 10000 set into groups of blocks, for each group of the process.

The main process (such as the block B20 and others) is a process that the set of original process instructions 10000 originally performs. More specifically, it is a reproduction process of the digital contents, the spreadsheet process, the document process, and the game process and others. The usage limit check process (such as the block A10 and others) is a process which checks whether the program is tampered or not. The usage limit check process (the block C30 and others) may also be a process to check whether or not digital data is tampered, or a process to check whether or not the user of the program knows the license password. The error process (the block C30 and others) is a process that should be performed when it is determined that the result of the usage limit check indicates that the program and others have been tampered. More specifically, the error process is a process which stops the execution of the program, or reports the tampering or the parts where the tampering has occurred to external server and others. Note that in the set of original process instructions 10000, whether the tampering exists or not is represented by the value of the variable a. More specifically, "a=0" when the tampering is detected, and "a=1" when the tampering is not detected. The block A19 in the end of the main process (the block A10 and others) includes branching, and the tampering in the set of original process instructions 10000 is determined by referring to the value or the variable a. Whether the subsequent processes proceed to the main process or the error process is determined accordingly.

Figure 12:
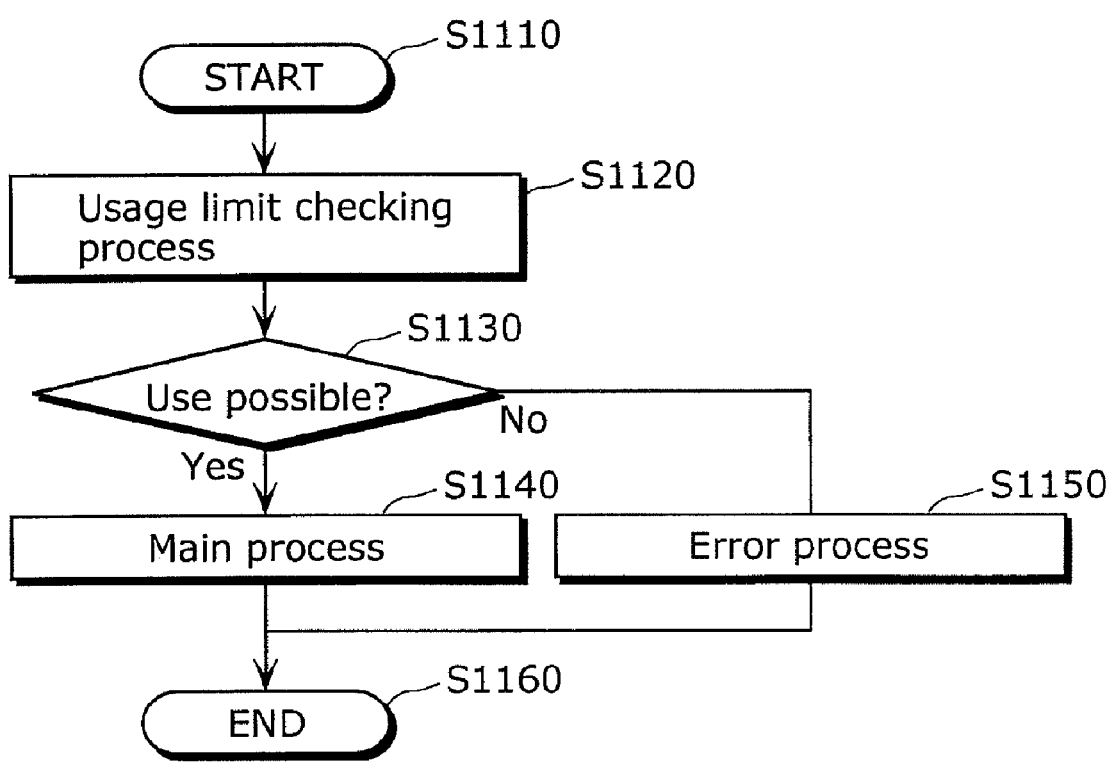
FIG. 12 shows the operations of the set of original process instructions.

FIG. 12 is a schematic diagram showing the operation of the set of original process instructions 10000.

First the process starts in step S1110. Subsequently, in step S1120, the usage limit check process (the block A10 and others) for determining whether the main process of the set of original process instructions 10000 (the block B20 and others) is executed. More specifically, the process proceeds until the block A19. Subsequently, in step S1130, the result of the usage limit check process is determined whether it is true or false. When it is true (no tampering exists, and the use of the main process is possible), the process branches to step S1140, and when it is false (there is a tampering, and the use of the main process is impossible) the process branches to step S1150. In step S1140, the main process of the set of original process instructions 10000 is executed. This indicates the process in the blocks after the block B20 out of the blocks configuring the set of original process instructions. Furthermore, in step S1150, the error process for the case where the main process of the set of original process instructions (the set of input instructions) is not executed. This indicates the process in the blocks after the block C30 out of the blocks configuring the set of original process instructions 10000. The process ends in step S1160.

Figure 13:
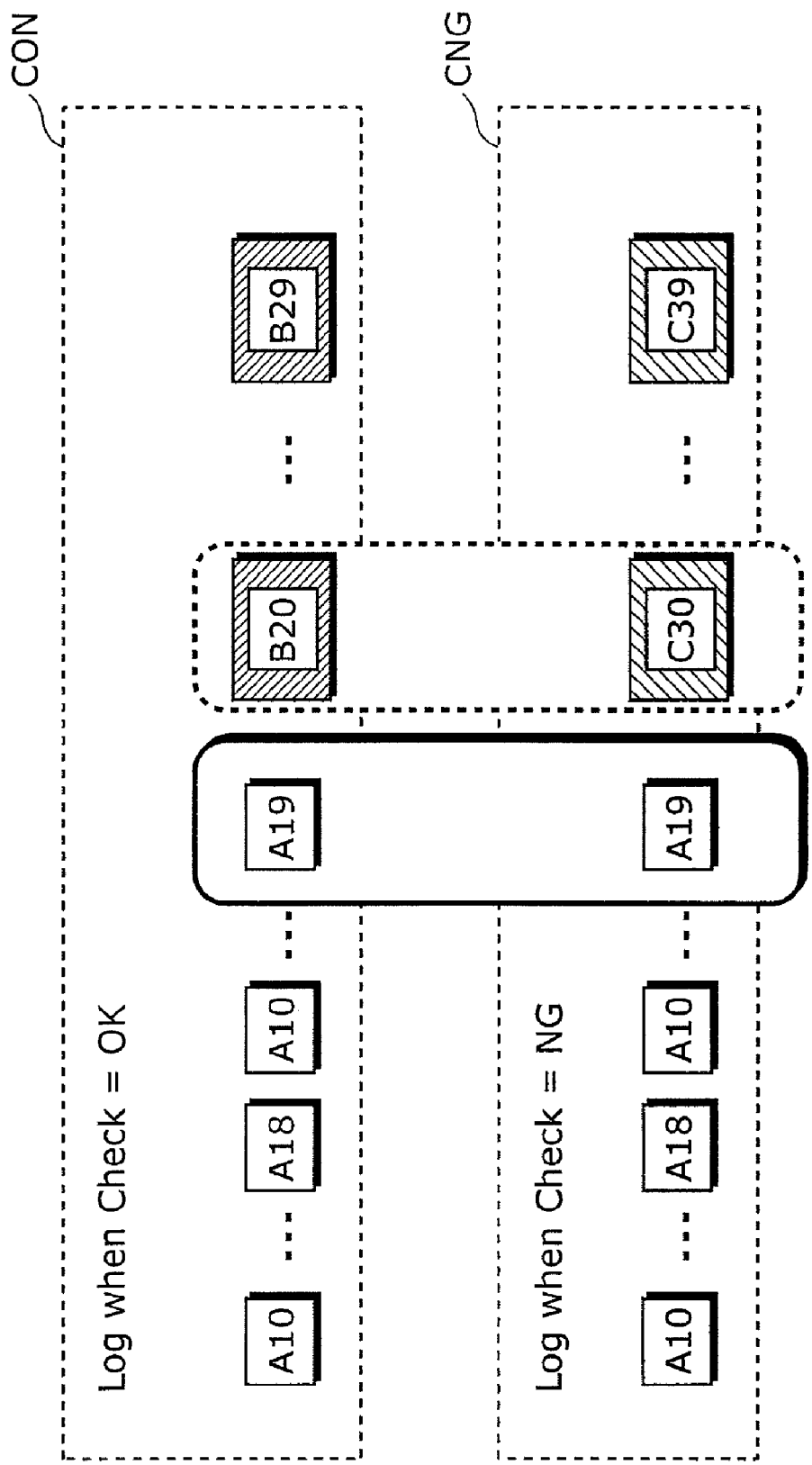
FIG. 13 shows an example of the execution log differential attack.

FIG. 13 shows a method for the execution log differential attack.

The execution log differential attack shall be described first based on the set of original process instructions 10000 (FIG. 11) with reference to FIG. 13.

In the execution log differential attack, the unauthorized analyzer first executes the set of original process instructions 10000 under the condition where the main process (the block B20 and others) are executed, and sequentially records an execution log indicating which block is executed. As a result, the execution log indicating that each block is executed in the order "A10, . . . A18, A10, . . . , A19, B20, . . . , B29", as shown in the execution log CON in the upper half of FIG. 13 is recorded.

Next, the unauthorized analyzer executes the set of original process instructions 10000 under the condition where the main process is not executed. For example, when the usage limit check (the block A10 and others) is a process for checking tampering, the unauthorized analyzer first tampers the object to be tampering-checked by the usage limit check (for example, the key indicating the right for using the main process), and executes the set of original process instructions 10000. Subsequently, the execution log is recorded in the same manner. As a result, the execution log indicating that each block is executed in the order "A10, . . . A18, A10, . . . , A19, C30, . . . , C39", as shown in the execution log CNG in the lower half of FIG. 13 is recorded.

Analyzing this log shows the unauthorized analyzer where the process branching occurs. More specifically, as shown with the broken line in FIG. 13, the block which is executed after the block A19 changes. Accordingly, the unauthorized analyzer can assume that the block A19 which is circled with the solid line is an instruction block for checking the tampering and for brunching.

More specifically, the unauthorized analyzer specifies the last block (the block A19) in the common part of the execution log CON when there is no tampering and the execution log CNG when there is tampering (the block A10 to the block A19) is an instruction block for branching as a result of the tampering check.

The unauthorized analyzer who obtained such information attempts to invalidate the tampering check process by tampering the block A19. More specifically, the unauthorized analyzer rewrites the conditional branching instruction at the end of A19 into the instruction block X19 (on the right of FIG. 11) which always branches to the block B20.

The diagram on the right side of FIG. 11 shows the set of original process instructions 10100 which is a set of process instruction obtained by tampering the set of original process instructions 10000 as described above. In the tampered set of original process instructions 10100, the block X19 always branches to the block B20 regardless of the result of the tampering check. Accordingly, the tampered set of original process instructions 10100 is unable to detect tampering, and always performs the main process (such as the block B20).

<Strategies Against Execution Log Differential Attack>

The execution log differential attack described above can be prevented by eliminating the set of process instruction which performs branching (the block A19), and transforming a part of blocks into dependent blocks (the block B26_2 in FIG. 14) which is to be described later. The following is an explanation for the dependent block.

The dependent block is an instruction block obtained by transforming the instruction in the block (the block B26) to be executed after the branching process (the block A19 in the set of original process instructions 10000 in the diagram on the left in FIG. 11) so as to perform an operation dependent of a parameter used for the branching (parameter a). The following is an explanation for the dependent block with reference to FIG. 14.

Figure 14:
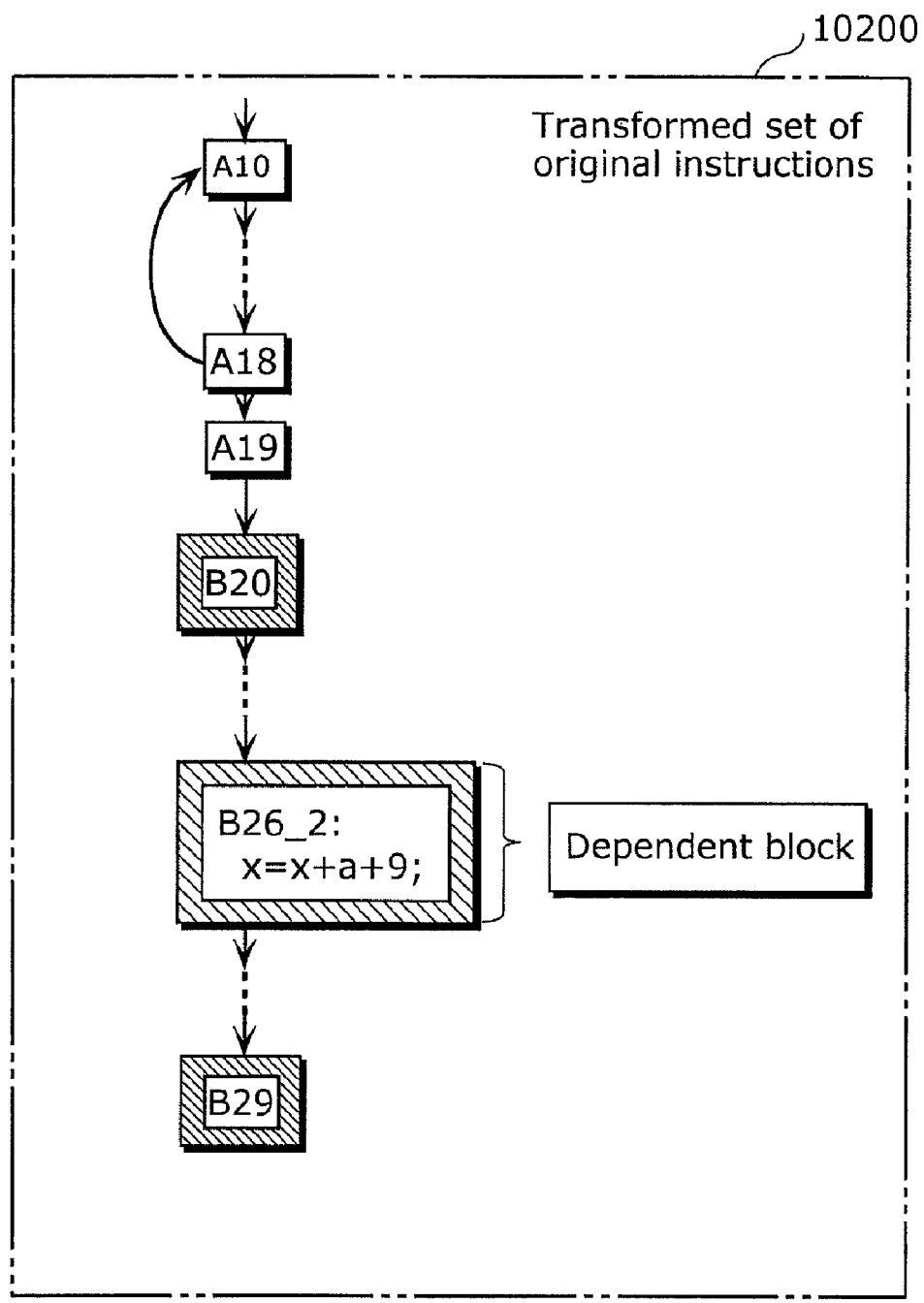
FIG. 14 shows an example of the set of instructions including the dependent block.

FIG. 14 shows the transformed set of original instructions 10200 after transforming the block B26 which includes the instruction "x=x+10;" in the set of original process instructions 10000 into the dependent block B26_2.

In the transformed set of original process instructions 10200, the block B26 before the transformation in the set of original process instructions 10000 in FIG. 11 is transformed into the dependent block B26_2, where the instruction "x=x+10;" is rewritten into "x=x+a+9;". Therefore, the operation of the block B26_2 changes in response to the tampering check process before the block A19. As described above, in the set of original process instructions 10000 in FIG. 11, when tampering is detected as a result of the tampering check, "0" is assigned to the value of variable a, and "1" is assigned to the value of the variable a when no tampering is detected.

Thus, in the block B26_2, when the usage limit check determines that execution of the main process is possible, 1 is assigned to the variable a, and "x=x+a+9;" in B26_2 is "x=x+1+9;." Therefore, in B26_2, the same process as B26 will be performed.

On the contrary, when the result of usage limit check process determines that the execution of the main process is not possible, 0 is assigned to the variable a to which the result of the usage limit check process is stored, and "x=x+a+9;" in B26_2 will be "x=x+0+9;". Thus, the process performed in B26_2 will be different from the process performed in B26. As a result, when the tampering in the program is detected, the transformed set of original process instructions (usage limit integrated set of process instructions) 110 would not perform normally.

Accordingly, although the branching, as a result of the tampering check (the branching process in the block A19 in FIG. 11) is eliminated, the usage control of the program can be properly performed. Furthermore, the branching dependent of the result of the tampering check has been deleted out of the program, and thus it is possible to make it difficult to see which block performs the process for tampering check by the execution log differential attack.

Note that the example of the dependent block is not limited to this specific example. More specifically, any transformation is acceptable as long as the part of the block in the main process is transformed to depend on the result of the usage limit check, and the main process is executed only when the result of the usage limit check shows "available".

For example, other than make the calculation of the value to be assigned to the variable to be dependent, it may be "x=table [y+a−1];" when the instruction before transformation is the table argument instruction "x=table[y];" (the instruction where the element of the index y in the array is assigned to the variable x).

Furthermore, the result of the usage limit check may be masked in the relationship between variables. More specifically, the result of the usage check may be stored as the variables where the result is calculated by a calculation formula determined by the values of the variables in advance. The result is indirectly stored as the values of the variables, and the result is masked. In this case, the dependent block is dependent of the relationship between the variables. For example, the variables not used in the set of original process instructions 10000 (the original process program) is referred to as the variables V1 and V2, and the result of the usage limit check is calculated by subtracting the value of the variable V2 from the value of the variable V1 such that the result of the usage limit check is obfuscated. More specifically, "V1=rand( ); V2=V1−a;" (the statement for assigning a random number to the variable V1, and assign a value obtained by subtracting the variable a from the variable V1 where the random number is assigned to the variable V2) is added in the end of the block A19. Here, the value of "V1−V2" equals to a regardless of the value of the variable V1. Accordingly, the dependent block B26_2 is generated by transforming "X=X+10;" (FIG. 11) in the block B26 into "X=V1+X−V2+9;". Note that the value of the right side of the assignment statement is V1+X−V2+9=x+a+9.

When such transformation is not performed, more specifically, when the statement is merely "x=x+a+9;" and when the result of the usage limit check is available, the value of the variable a is always "1" in the set of dependent process instructions "the transformed set of original process instructions 10200), and the value of the variable a in the set of dependent process instructions is always "0" when the result of the usage limit check is not available. Furthermore, the value of the variable a is not masked with the process described above. Accordingly, the unauthorized analyzer can find the process instruction for processing the variable a by finding the process instruction including the variable where 0 and 1 is inverted using the availability of the usage limit, and thus can find the set of dependent instructions (the block B26_2). On the other hand, in the case described above, more specifically, when the value of the variable a is masked, the values of the variable V1 and the variable V2 are different each time. Thus, even when the process instruction including the variable having inverted 0 and 1 is found using the attack described above, it is not possible to find the set of dependent process instructions (the block B26_2).

<Obfuscation of the Instruction Including the Dependent Block>

As described above, by transforming the set of original process instructions 10000 (FIG. 11) into the set of instructions including dependent blocks (transformed set of original process instructions 10200: FIG. 14) can eliminate the conditional branching instruction (the branching process in the block A19), and can obtain the same result as the case where the conditional branching instruction is included. Furthermore, in this case, more specifically, even when the transformation to the transformed set of original process instructions 10200 is performed, and when a loop is included in the tampering check process, for example (the blocks A10 to the block A18 in FIG. 14), is it possible to roughly assume where the boundary between the tampering check and the other set of instructions (the block A19).

Accordingly, it is preferable to obfuscate the set of instructions where the conditional branching is eliminated with the transformation described above (the transformed set of original process instructions 10200: FIG. 14) with the method set forth in the first embodiment. Here, the operation of the set of obfuscated instructions 14000 (see FIG. 15 and the set of obfuscated instructions 3000 in FIG. 4) which is obtained by transforming the transformed set of original process instructions 10200 and the procedure for transforming the original process program (the transformed set of original process instructions 10200) into the set of obfuscated instructions 14000 is the same as the operation and the procedure set forth in the first embodiment.

However, in the second embodiment, unlike the first embodiment, the following limitation occurs when randomizing the execution order of the process. As described above, the dependent block (the dependent block b26_2) operates dependent of the value of the variable (the value of the variable a) determined by the process preceding the block. Accordingly, when the dependent block is executed before the value expected for the value of the variable to which the dependent block depend on is assigned, normal operation of the dependent block is not assured. For this reason, it is necessary to execute the dependent block after the process for confirming the value of the variable to which the dependent block depends on. In other words, the dependent block has a data dependent property to the process for confirming the value.

For example, in the second embodiment, the value of the variable a is determined by the process of the usage limit check and the dependent block B26_2 operates according to the resultant value of the process of the usage limit check. Thus, if the dependent block B26_2 is executed before the process of the usage limit check ends, there is a possibility that the value of a at the point in time where the dependent block B26_2 is executed would not be the value identical to the expected value, more specifically, the value identical to the result of the process of the usage limit check. For this reason, it is necessary to modify the content of the set of selection instructions 3002 such that the dependent block B26_2 is executed only after the usage limit check. More specifically, it is necessary for the set of selection instructions 14002 (see FIG. 15 and the set of selection instruction 3002 in FIG. 4) in the second embodiment to terminate the progress of the main process and make the set of instruction proceeding the process of the usage limit check when the value of the block number holding unit corresponding to the main process is the number indicating the dependent block B26_2 (26, as will be described in detail below).

Figure 15:
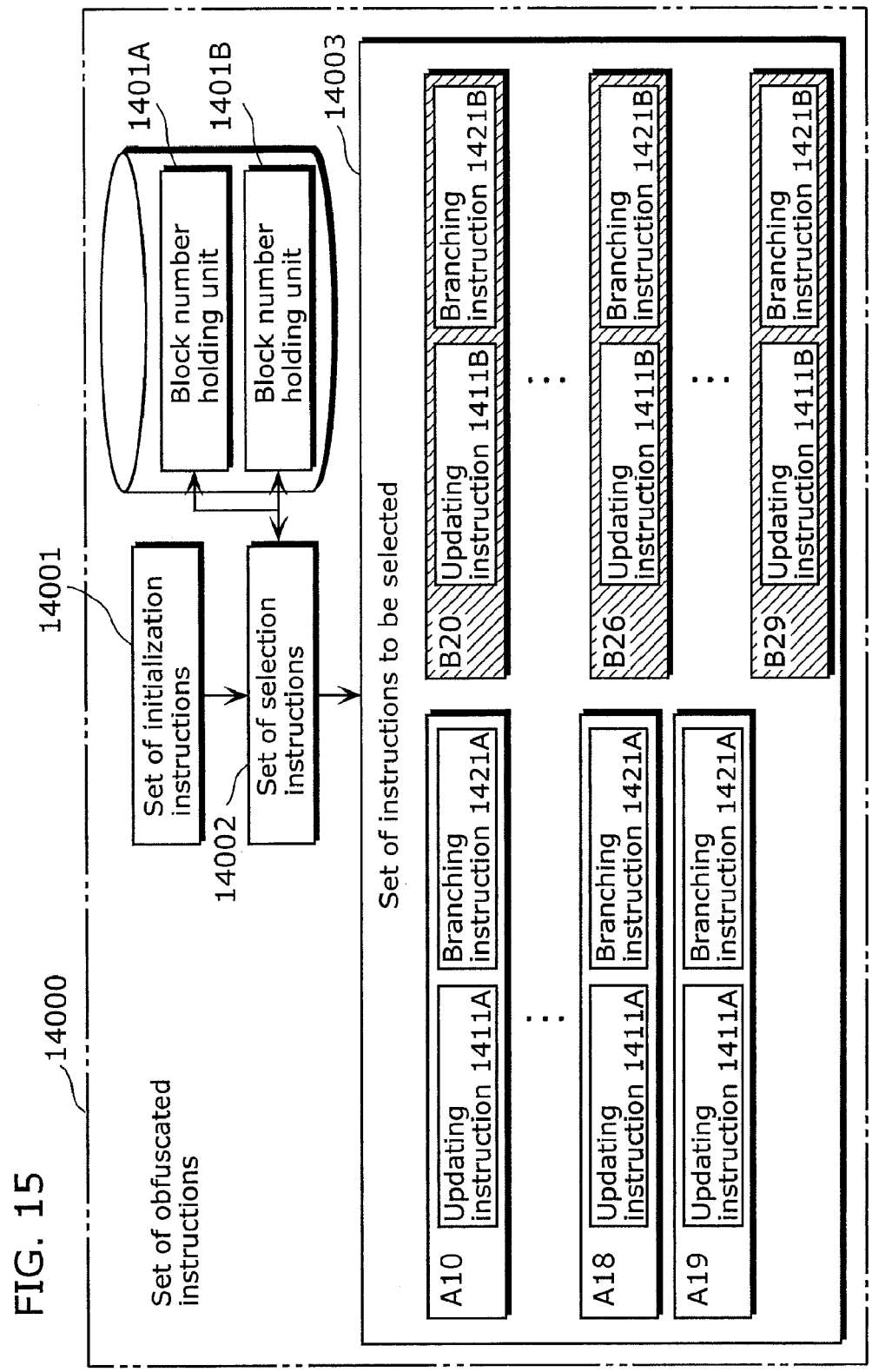
FIG. 15 shows an example of the set of obfuscated instructions.

FIG. 15 shows an example of the set of obfuscated instructions 14000 according to the second embodiment.

Here, regarding the configuration identical to that of the first embodiment, the reference numerals identical to the first embodiment are assigned and the detailed description shall be omitted.

The set of obfuscated instructions 14000 are different from the set of obfuscated instructions 3000 according to the first embodiment in the content of the set of selection instructions. More specifically, the content of the set of selection instructions 14002 is different from the set of selection instructions 3002 in FIG. 4.

The set of selection instructions 14002 selects the block which is executed next based on the values of the variable block_no0 and the variable block_no1, and store the identifier (block number) of the selected block to be selected in the variable sw. There are five cases of selections, as shown below.

1) When block_no0 and block_no1 are both 0, the set of selection instructions 14002 ends the execution of the set of obfuscated instructions 14000 with "return;" statement when both the last process of the usage limit check and the last process of the main process have ended.

2) When block_no0 is 0 and block_no1 is not 0, more specifically, when the last process in the usage limit check has ended and when the last process of the main process has not ended, the set of selection instructions 14002 selects the block in the main process. More specifically, the identifier of the block to be executed next out of the blocks of the main process stored in block_no1 is stored in the variable sw.

3) When block_no0 is not 0 and when the block_no1 indicates the block number of the dependent block, more specifically, when the last process of the usage limit check has not ended and the process to be executed next to the main process is dependent block, the set of selection instructions 14002 selects the block for the usage limit check. The configuration is configured for the following reasons. More specifically, it is necessary to end the process in the usage limit check in advance since the dependent block is a process dependent on the result of the usage limit check. More specifically, the set of selection instructions 14002 stores the identifier of the block, stored in block_no0, to be executed next for the usage limit check in the variable sw in this case. Note that when all of the process for the usage limit check ends, block_no0 is 0, and block_no1 is not 0 (more specifically, the block number (26) of the dependent block). Thus, the process after the dependent block resumes with the above 2).

4) In other cases, more specifically, when the last process of the usage limit check has not ended, and when the main process does not reach the dependent block, the set of selection instructions 14002 execute either the blocks in the usage limit check or the main process. Here, for example, the set of selection instructions 14002 generates a random number, and selects either of them at random based on the value of the generated random number.

Furthermore, in the second embodiment, unlike the first embodiment, the blocks in the set of instructions to be selected 14003 do not include an expanded loop. Instead, the loop operation is achieved by providing a branching instruction ("if(i==2)..." in the block A18 in FIG. 17) for branching the process flow to the branch corresponding to whether the number of execution is the number of repeat in the loop or not, in the updating instruction in the block corresponding to the end of the loop (the block A18 in the second embodiment: see FIG. 1 and FIG. 17), according to the number of execution of the block. Note that, here, the branching condition i==2 in the branching instruction is because the number of repeat of the loop is 2, as shown in the "for" statement in FIG. 1.

The description shall be made hereafter along with the second embodiment. The block to be executed after the block A18 is the block A10 until the block A18 is executed N(=2) times, which is the number of repeat. In this example, the statement "block_no0=10; in the block A18 in FIG. 17 achieves this control. Furthermore, when it is executed for N times, the block A19 subsequent to the loop is executed after the block A18. In this example, the statement "block_no0=19;" achieves this control.

In other words, in order to implement the loop, the block A18 records the number of execution of the block A18 (see the variable i), and store the block number indicating the block A10 which is the beginning of the loop (10 indicated in the block A18 in FIG. 17) in the block number holding unit 1401B (FIG. 15) until the number reaches N (when i<N(=2), more specifically, when i==2) and when the number reaches N (and if i==2), the block A19 stores the block number indicating the block A19.

Note that, although the storage area for counting the block number of the loop may be performed in any way. In the second embodiment, explanation is made assuming that the set of initialization instructions 14001 secures the area with the statement "int i=0" of the variable i shown in FIG. 17. However, the area may be secured in advance, and the secured area may be used as well.

In the second embodiment, as in the first embodiment, the block number holding unit 1401B manages the progress or the main process, and thus the switching of the execution order of the block between the processes can be performed whether it is inside the loop or not. More specifically, the set of selection instructions 14002 execute the blocks outside the loop such as the block B3 outside the loop during the process in the loop, for example, when the process in the block A10 ends and before the process in the block A11 ends. Despite such execution, the updating instruction in the block outside the loop prevents a case where the block outside the loop is inappropriately executed for more than twice.

<Specific Example>

FIG. 16 is a representation of the specific example of the set of original process instructions according to the second embodiment (the set of original process instructions 10200) in the C language.

However, the set of original process instructions 10200 shown in FIG. 16 is the transformed set of original process instructions 10200 shown in FIG. 14. More specifically, the set of original process instructions 10200 in FIG. 16 is the set of instructions where branching instruction for branching the process according to the result of the check process has been deleted, and the block B26 has been transformed in the dependent block B26_2 (FIG. 14). Note that the number of loop from the blocks A10 . . . A18 is two.

Figure 17:
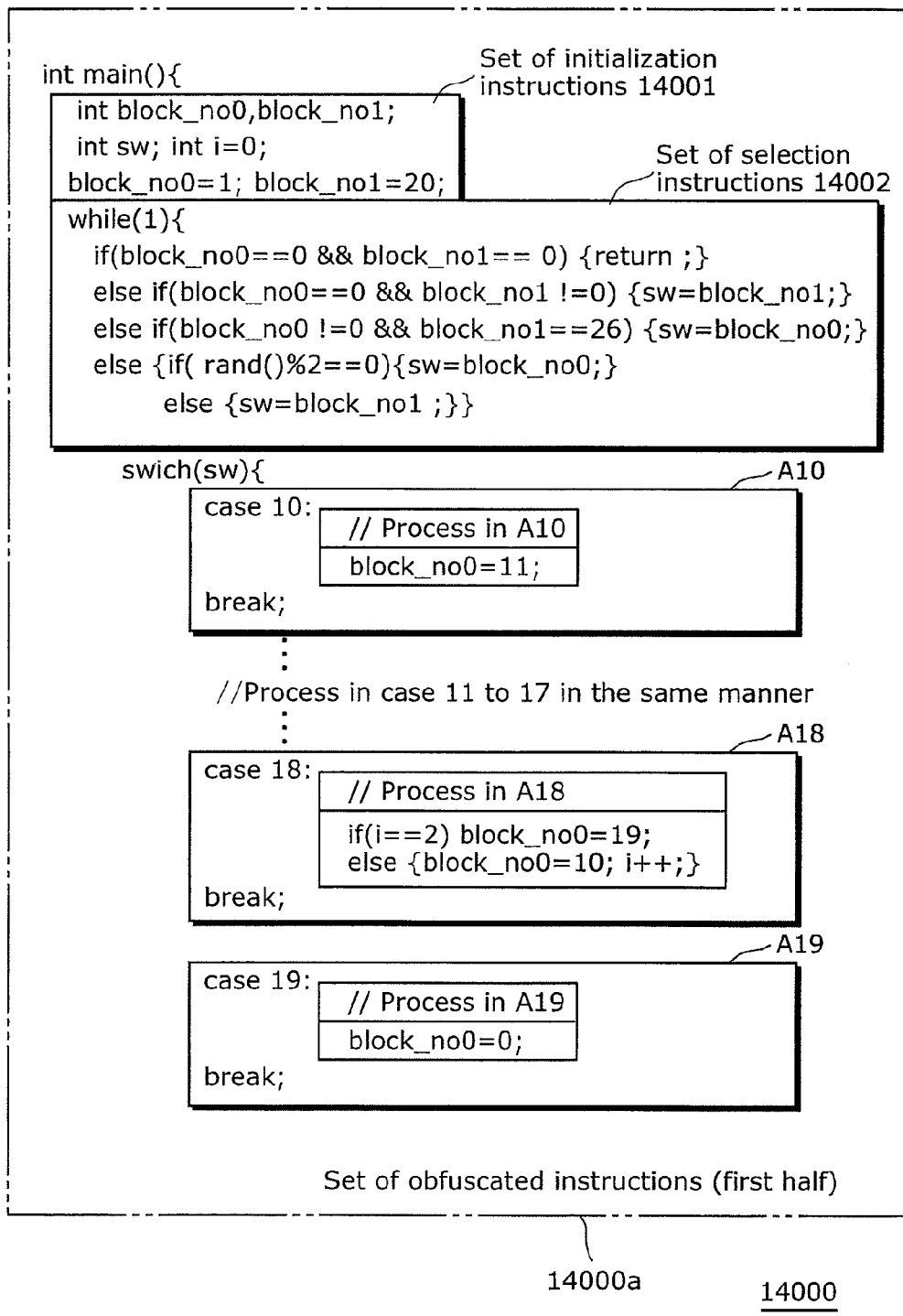
FIG. 17 shows an example of the set of obfuscated instructions.

FIG. 17 shows the configuration of the first half 14000a of the set of obfuscated instructions 14000 (FIG. 15) in the second embodiment.

Figure 18:
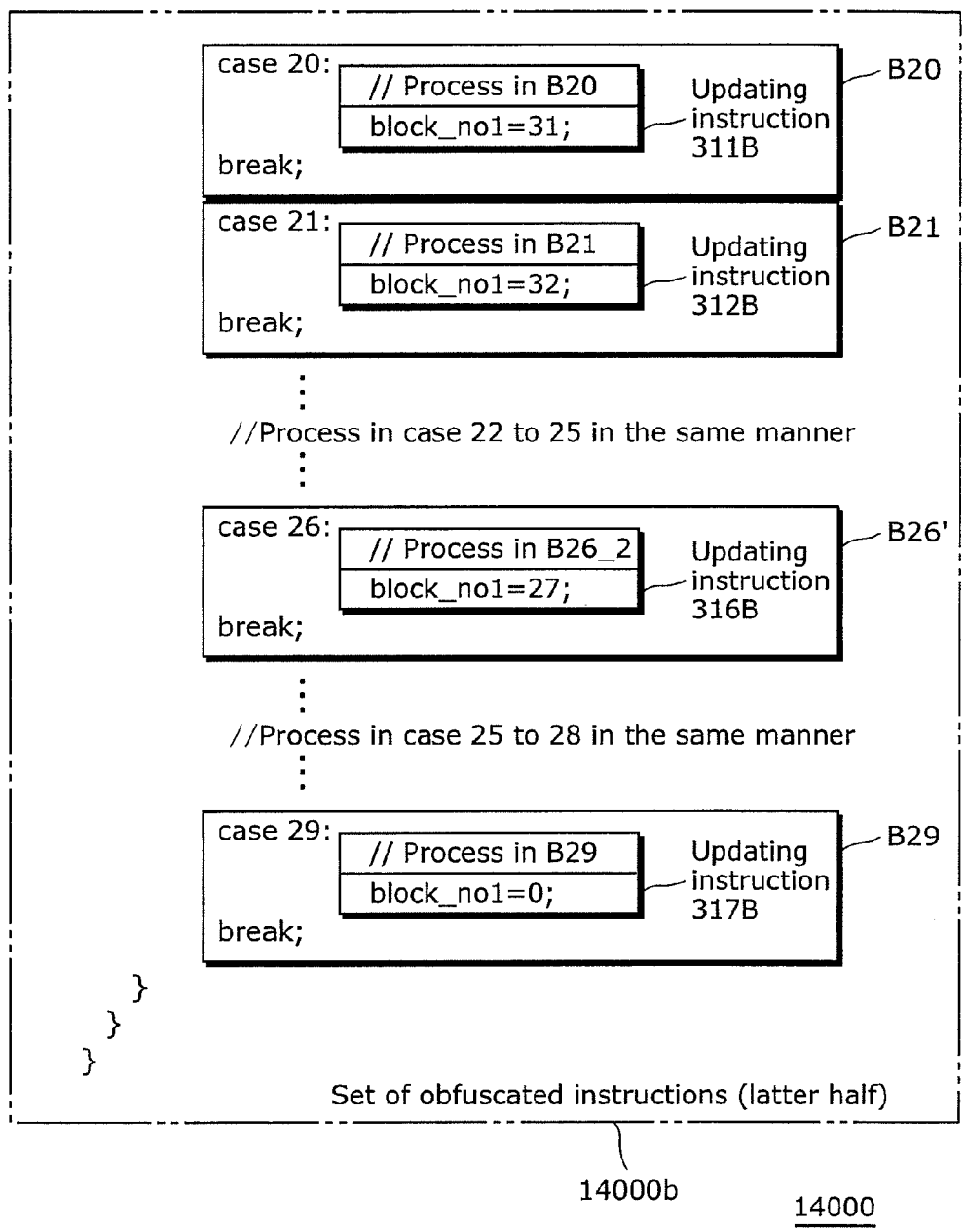
FIG. 18 shows an example of the set of obfuscated instructions.

FIG. 18 shows the configuration of the latter half 14000b of the set of obfuscated instructions 14000 (FIG. 15) in the second embodiment.

FIGS. 17 and 18 respectively show the set of obfuscated instructions 14000 which is a specific example of the set of obfuscated instructions obtained by obfuscating the transformed set of original process instructions 10200 (FIGS. 4 and 16) shown in FIG. 16. The set of obfuscated instructions 14000 in the second embodiment is identical to the set of obfuscated instructions 3000 in the first embodiment in the basic configuration; however, the set of instructions to be described below are different.

The set of initialization instructions 14001 according to the second embodiment is basically identical to the specific example of the set of obfuscated instructions 3000 (the set of initialization instructions 3001 shown in FIG. 4 and others). However, in the set of initialization instructions 14001 in the second embodiment, the loop is processed without expansion, and thus the declaration for the variable (the variable i) for counting the number of repeat of the loop cannot be omitted. Note that for the other variables necessary in each block, the example of the variable declaration and initialization have been omitted as in the first embodiment.

The set of selection instructions 14002 according to the second embodiment is configured of the conditional branching instruction for achieving the four patterns ("1)" to "4)"), as described above. Note that, in this specific example, the branching occurs whether block_no1 is "26" or not since the block number of the block B26_2 is "26". More specifically, the set of selection instructions 14002 controls the process based on the conditional expression "block_no1==26".

The updating instruction in the block A18 is configured with the conditional branching instruction (if(i==2) . . . ) in order to implement the loop operation. More specifically, the updating instruction in the block A18 assigns the block number "19" of the block A19 which is a block immediately after the loop to block_no0 when the N (two) repeats are executed. Furthermore, the updating instruction of the block A18 assigns the block number "10" of A10 which is the start of the loop to block_no0 until N repeats are executed. This control achieves the process of the loop.

Explanation for the configuration of the other set of instructions is omitted since they are identical to the set of instructions in the first embodiment.

<Explanation for the Obfuscation Device>

Figure 19:
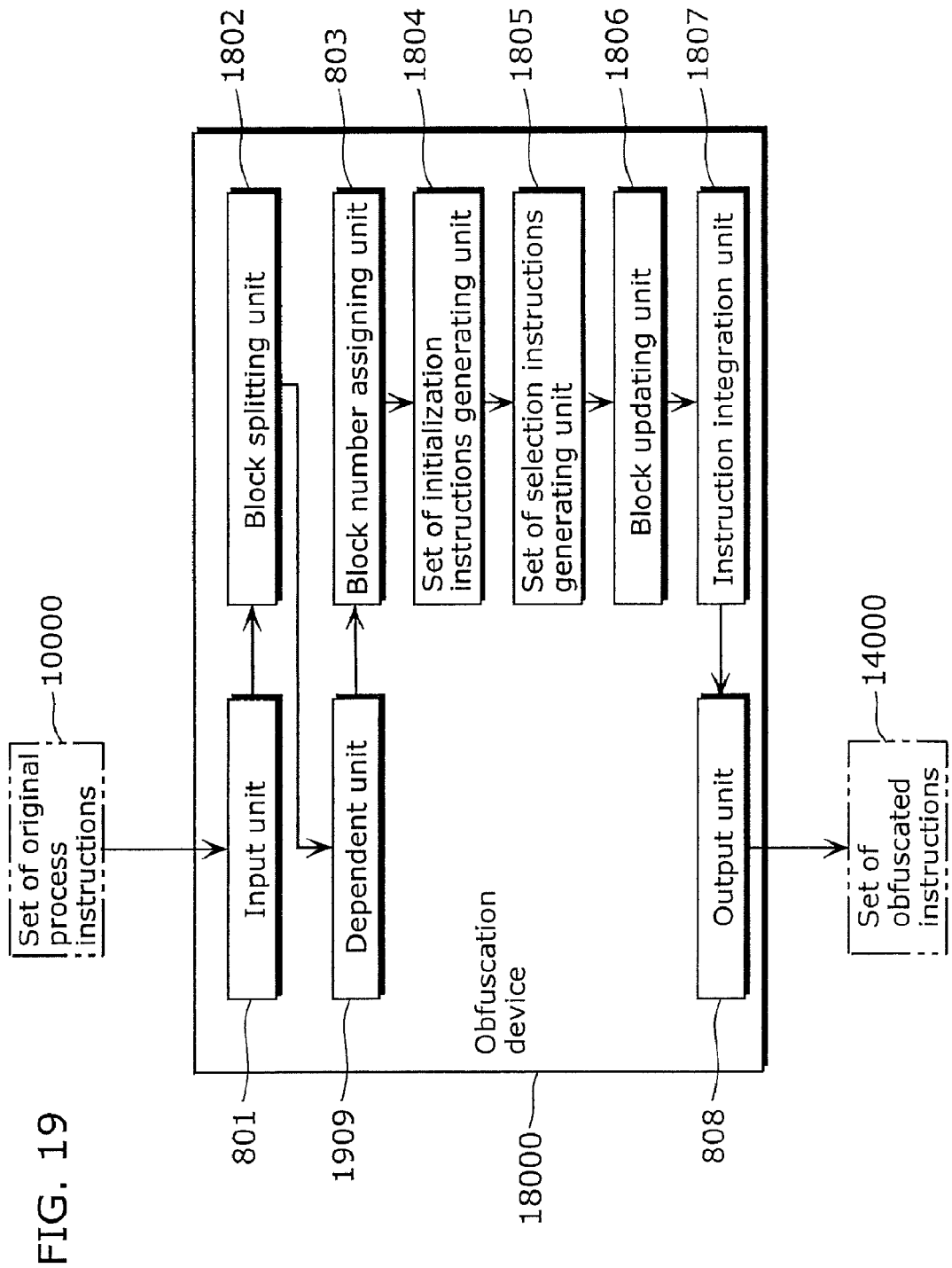
FIG. 19 shows the structure of the obfuscation device.

FIG. 19 shows the configuration of the obfuscation device 18000 which transforms the set of original process instructions 10000 to the set of obfuscated instructions 14000.

Since the configuration of the obfuscation device 18000 is basically identical to the obfuscation device 8000 in the first embodiment (FIG. 9 and FIG. 2), the parts for implementing the equivalent functions are assigned with the same reference numerals as in FIG. 9, and the description shall be omitted.

The block splitting unit 1802 splits the input set of original process instructions 10000, and generates each block. The basic operations are identical to the operations described in the first embodiment; however, the operation is different in that the loop is not expanded, and the information indicating the block at the beginning of the loop, the block at the end of the loop, and the number of repeat in the loop is generated.

The dependent unit 1909 transforms the set of instructions (multiple blocks) received from the block splitting unit 1802 into the set of instructions (multiple blocks) including the dependent blocks. In the second embodiment, the conditional branching instruction (see the block A19 in FIG. 11) is deleted from the set of instruction split into blocks. Furthermore, the dependent unit 1909 transforms a part of the blocks in the main process (the block B26 in FIG. 11) into the dependent block dependent on the variable that was used for determining the branching by the conditional branching instruction.

The set of initialization instructions generating unit 1804 generates the set of initialization instructions 14001 (FIG. 15). This operation is identical to the operation in the first embodiment in the basic operation. However, as noted before, the set of initialization instructions 14001 cannot omit the variable (the variable i) declaration used for counting the number of repeat in the loop.

The set of selection instructions generating unit 1805 generates the set of selection instructions 14002. This operation is identical to the operation in the first embodiment in the basic operation. However, the operation is different in that the set of selection instructions generating unit 1805 must generate the set of selection instructions 14002 that keeps selecting block number holding unit 1401A corresponding to the usage limit check in the case where an instruction for terminating the usage limit check process before the process in the dependent block when the main process reaches the dependent block (the block B26_2 in FIG. 14), more specifically, when the abovementioned condition (the conditional expression "block_no0 !=o && block_no1==26") is satisfied.

The block updating unit 1806 generates the updating instruction and the branching instruction for each block, and adds the generated updating instruction and the generated branching instructions. Here, the block updating unit 1806 generates an updating instruction for ending the loop when the block is executed as many as the number of repeat of the loop, and returning to the beginning of the loop until then, and adds the updating instruction to the block. More specifically, the block updating unit 1806 adds the instruction having the function described below as the updating instruction. More specifically, the updating instruction added to the last block of the loop stores (the statement "block_no0=19";), in the block number holding unit corresponding to the process belonging to the block (the block number holding unit 1401B), the block number of the block (the block A19: see FIG. 16 and others) to be executed after the loop. In other cases, the updating instruction in the end of the loop stores the block number of the block in the beginning of the loop (the block A10) (the statement "block_no0=10"; in the block A18 in FIG. 17), and increments the count of the repeat by one (the statement "i++;").

The description for the other configurations is omitted since they are identical to the configurations in the first embodiment.

Furthermore, the description for the operations of the obfuscation device 18000 will be omitted since they are identical to the operations described in the first embodiment.

The explanation of the second embodiment ends here; however, the present invention is not limited to the description above. The present invention includes a variation described below.

In the second embodiment, the obfuscation is performed for the set of instructions including the block (the block B26_2 in FIG. 14) made to be dependent on the variable used for processing the conditional branching instruction (the variable a). However, the present invention is not limited to this. For example, depending on the set of instructions, the variables are referred in the complex, tangled manner, and thus it is difficult to classify independent processes which do not refer to the variables each other. In this case, the execution order of the process may be made complex by classifying the process performed by the set of instructions into a few kinds of processes which refers to a part of variables each other or unidirectionally, and by generating the set of selection instructions identical to the set of selection instructions in the second embodiment having the block including the variable as the dependent block. In this case, the execution of the block referring to the variables in the other processes is withheld until the content of the variable is fixed.

Furthermore, in the second embodiment, the dependent block can only be executed only after the completion of all of the processes of usage limit check; however, the present invention is not limited to this. The execution of the dependent block is withheld because the content of the variable a is not fixed. For this reason, if the analysis of the set of original process instructions shows, for example, that the value of the variable a is fixed in the middle of the processes for usage limit check, the execution of the dependent block may be withheld until the execution of the block for determining the value of the variable a.

<Effect of the Second Embodiment>

The set of obfuscated instructions 14000 in the second embodiment does not have the branching instructions in the process for usage limit check. Accordingly, even when the unauthorized analyzer tries to perform tampering for replacing the branching instructions in the usage limit check with the unconditional branching instructions, such tampering cannot be performed.

Furthermore, in the second embodiment, the execution order of the blocks makes it hard to be analyzed even when the set of instructions includes a loop.

Figure 20:
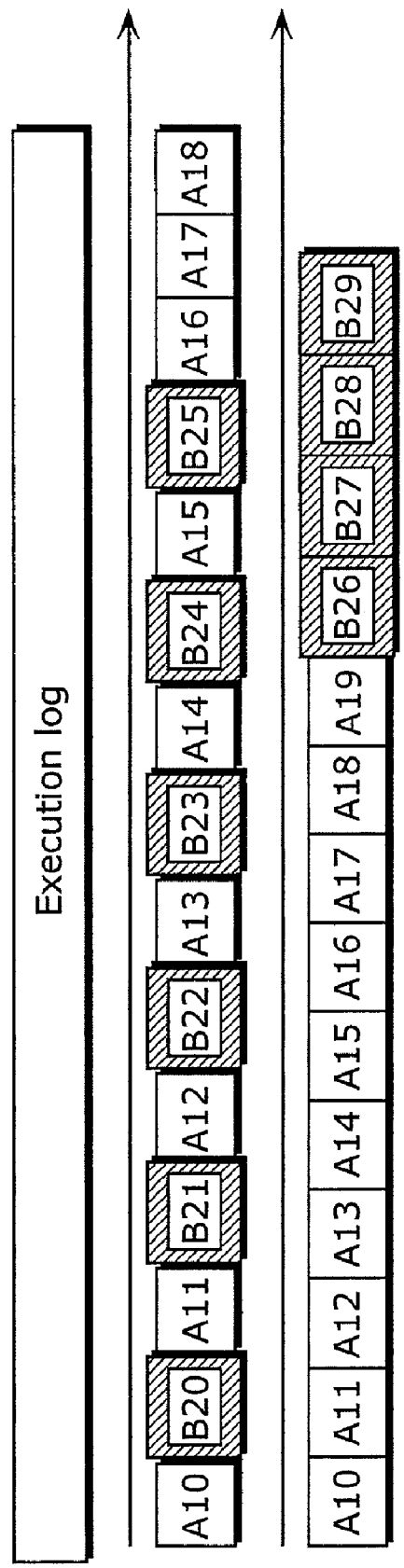
FIG. 20 shows an example of the execution log of the set of obfuscated instructions.

FIG. 20 shows the execution log when random numbers are generated while alternating between 0 and 1, and the execution log of each block is shown in the order from upper left, upper right, lower left, and lower right.

Note that FIG. 20 shows a two-line log. The log on the second line is the log for the process subsequent to the process of the log of the first line. Furthermore, the log in each line indicates the log of the process in earlier hour towards the left.

As shown in the diagram, in the set of obfuscated instructions 14000, even when the process for the usage limit check is a program including the loop (the block A10 to the block A18) the process for the usage limit check and the main process are alternately executed (until the execution of the block A16 in the log), which makes the program difficult to be analyzed.

The following is the more specific explanation. Assume a case where the unauthorized analyzer performs the analysis while understanding the blocks one by one sequentially. When performing such an analysis, unless the execution order is not switched, the unauthorized analyzer can completely understand the operations of the usage limit check by understanding the ten blocks in the execution log(A10, A11, . . . and A19).

On the other hand, in the set of obfuscated instructions 14000 in the present invention, the execution log is (A10, B20, A11, B21 . . . A19), as shown in FIG. 20. The execution log includes the process including ten blocks from the block A10 to the block A19, and the process including the six blocks from the block B20 to the block B25, and thus the execution log as a whole includes the process having 16 (=10+6) blocks. Here, the block B20 to the block B25 are the blocks ranging from the block in the beginning of the main process to the block immediately before the dependent block B26_2.

As shown in this structure, switching the execution order increases the number of blocks that the unauthorized analyzer have to analyze while understanding the block increases from 10 to 16, or by 6 blocks. Accordingly, the number of blocks that the unauthorized analyzer have to understand increases by the number of increased blocks, which makes it difficult to be analyzed.

Note that, in this example, the increase in the number of blocks that the unauthorized analyzer has to analyze is only six; however, generally, the main process includes a number of blocks, and thus the number of blocks that the unauthorized analyzer has to analyze in the actual system increases more than six, and the increase will be great in number.

Furthermore, in this example, there is imbalance in the execution order in the lower half of FIG. 20 due to the relationship between the number of blocks in the process for the usage limit check and the number of blocks in the main process. Accordingly, this is a little insufficient for the measure to the unauthorized analysis. However, in the actual system there is a low possibility in the random number sequence alternating between 0 and 1, and thus, an execution log that is dispersed more than the case described in FIG. 20 can be obtained. Furthermore, in the main process, the variable as in the variable in the main process (the variable identical to the variable in the main process, for example) is used, a dummy block which performs a process which does not affect the result of the main process (or the execution of the process itself is not performed) may be added. The dummy block may be added in this manner, and the number of the blocks may be increased. Furthermore, when classifying the process, modifying the classification such that the number of blocks are evenly distributed as much as possible allows generation of the set of obfuscated instructions 14000 from which the log difficult to be analyzed. More specifically, the number of blocks included in each classified set of instructions (see the third first set of instruction 2001, the second set of instructions 2002) may be classified into a plurality of classified set of instructions including only the classified set of instructions as many as the number in the predetermined range. Here, the classified set of instructions includes a plurality of blocks which is multiplied number obtained by multiplying the number of the plurality of blocks by the number of the repeat where the plurality of blocks included in the loop in the set of instructions upon which the classified set of instructions is based are expanded.

(Other Variation)

Note that, although the present invention have been described based on the abovementioned embodiments, it is needless to say that the present invention is not limited to the embodiments. The present invention also includes a variation described below.

(1) In the second embodiment, the obfuscation where the set of original process instructions 10200 is transformed into the set of obfuscated instructions 14000 having a different branching destinations (the block A10 or the block A19) depending on how many times the loop is executed (the value of variable i); however, the obfuscation may not be limited to that. For example, as in the second embodiment the set of original process instructions including conditional branching instructions can be obfuscated by providing a plurality of sets of the updating instructions and the branching instructions corresponding to the condition of each branch in the block including the conditional branching instructions. For example, in the set of original process instructions 10200, if a condition where a conditional branching instruction is included and when the predetermined condition is fulfilled, the process flow is controlled to the block in the first branching destination other than the block in which the conditional branching instruction is included, and when the predetermined condition is not fulfilled, when controlling to the other second branching destination, the transferred where the block included in the transferred set of obfuscated instructions 14000 is included may include the first updating instruction and the first branching instructions which are executed when the condition is fulfilled and the second updating instruction and the second branching instructions when the condition is not fulfilled. Here, the first updating instruction updates to the block number in the first branching destination block, and the second updating instruction updates to the block number in the second branching destination block.

(2) Although the execution to be proceeded is randomly determined in the first and second embodiments, the present invention may not be limited by this. For example, the block to be executed may be selected according to the predetermined numerical sequence. However, in this case, the analysis will be easy when the unauthorized analyzer understands the contents of the numerical sequence. For this reason, it is necessary to securely protect the information regarding the numerical sequence by, for example, recording the information in the anti-tampering recording unit, for example.

Furthermore, in the first and second embodiments, random selection is implemented by generating random numbers at the time when determining the process to be executed, and making a random selection based on the random number. However, the method for randomly selecting the process to be proceeded is not limited to this. For example, a random number sequence may be generated when starting the execution of the set of obfuscated instructions 14000, and the process to be proceeded may be selected based on the random number sequence.

Furthermore, in the first and second embodiments, the process where the execution to proceed is randomly determined; however, it may also be determined depending on the value of a variable included in the set of original process instructions. Furthermore, when determining which process to proceed, the configuration may be that a value of which variable to be used is randomly determined out of the plurality of variables included in the set of original process instructions. For example, the process specified by the value of the variable that is randomly selected out of the plurality of variables may be selected as the process to proceed.

Furthermore, instead of providing the process for generating the random number in the set of selection instructions 14002, the process for generating the random number may be performed by each block. In this case, the variable where the random number is stored is provided, and the process for storing the value in the variable is added to each (or a part of) block. Subsequently, the set of selection instructions 14002 determines the process to be executed according to the value of the variable. Furthermore, the configuration may be that the value of the random number that should be stored for obfuscation is determined in advance, and the predetermined value of the random number may be added. Furthermore, the value to be stored in the variable may be determined based on a predetermined rule instead of being randomly determined.

Although in the first and second embodiments, the block number holding unit 301A and the block number holding unit 301B are shown as different storing units by different variables (block_no0, block_no1), both of the values may be stored in one variable. For example, the number for the process A may be stored in the upper 8 bits of a variable, and the number for the process B may be stored in the lower 8 bits of the variable. Furthermore, the updating instruction may not be limited to the instruction for assigning a value in the block number holding unit. For example, the configuration may be implemented by a table showing a value to be transformed corresponding to a value stored in the block number holding unit. In this case, a configuration where the table is protected by storing the value in the table after transforming to the values into transformed data that is hard for the unauthorized analyzer and others by encryption, for example. When a table like this is used, all of the updating tables refer to the identical table. Accordingly, the configuration may be that one updating instruction is provided as a whole instead of individual blocks respectively including updating instructions as described in the first and second embodiments; and the updating instruction is executed after each block is executed. More specifically, for example, a table where the current value stored in the block number holding unit and the value that should be stored next are stored in association with each other is provided in the obfuscation device 18000. Subsequently, the updating instruction for updating the current value of the block number holding unit where the stored value is updated into a next value shown according to the correspondence shown in the provided table is provided in the set of obfuscated instructions 14000. Subsequently, a branching instruction for executing updating instruction is provided in each block included in the set of obfuscated instructions 14000 as the last instruction in the block.

Furthermore, the process where the set of selection instructions 14002 determines the block to be executed next may also be implemented using a table. More specifically, a table indicating the branching destinations depending on the value in the block number holding unit. Furthermore, the set of selection instructions 14000 may be instructions by referring to the value corresponding to the selected process in the block number holding unit and refers to the table.

(3) In the first and second embodiments, the program descriptive language is the C language. However, the present invention may not be limited to this, and the set of original process instructions and the set of obfuscated instructions may also be described in other programming languages. Furthermore, the set of original process instructions and the set of obfuscated instructions may not be described in the same program descriptive language. For example, a compiler may be embedded in the obfuscation device, and compiling to another language may be performed after obfuscation.

(4) Although it is described that the execution of all of the processes are judged in the set of selection instructions 14002 in the first and second embodiments, the present invention is not limited to this. For example, each block configuring the set of instructions to be selected checks the degree of progress of each process, and the execution may be stopped at that point in time if execution of all of the processes is completed. This may be implemented by checking the execution status whether or not the process in the classified set of instructions, the block number of which is held in the block number holding unit is completed (whether the value is "0" or not, in the example above) by referring to the block number holding unit from the block, and by checking whether or not the process in all of the classified set of instructions are completed or not.

(5) In the first and second embodiments, the present invention is described based on the set of obfuscated instructions; however, the present invention is not limited to this. For example, the processing device which implements a part of or all of the operations of the set of obfuscated instructions like hardware may also be included in the present invention.

Figure 21:
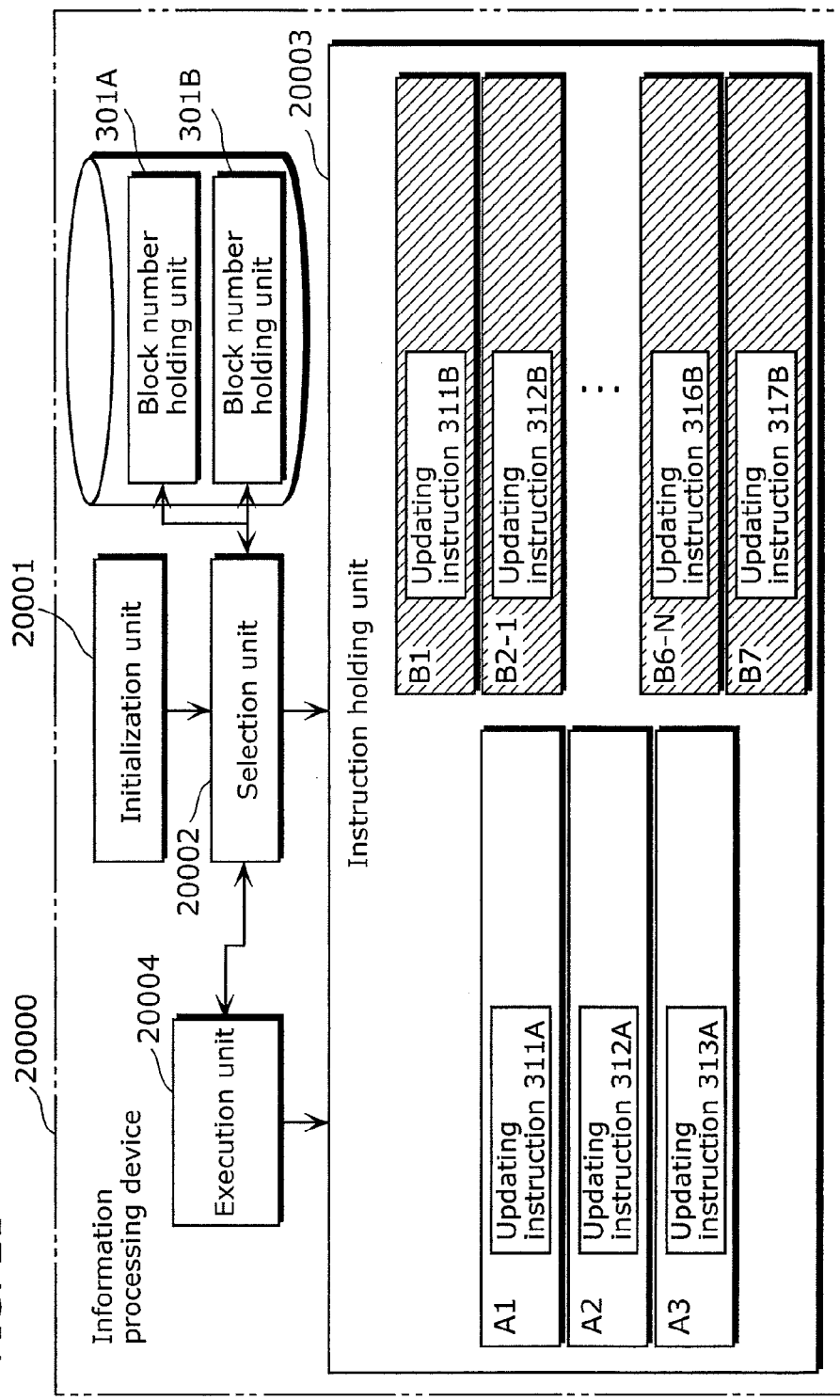
FIG. 21 shows the structure of the information processing device.

FIG. 21 is an example of the processing device which performs operations identical to those by the set of obfuscated instructions 3000 according to the first embodiment.

The components identical to the ones in the description for the set of obfuscated instructions 3000, more specifically, the component for the functions corresponding to the functions indicated by the description for the set of obfuscated instructions (for example, identical), are assigned with same reference numerals, and the detailed description is omitted.

The initialization unit 20001 performs the operations identical to the set of initialization instructions 3001. More specifically, the initialization unit 20001 initializes the value of the block number holding unit 301A and the block number holding unit 301B. Note that, when implementing the operation of the set of obfuscated instructions as the operations by the information processing device, the block number holding unit may secure the area in advance, or the area may be secured on the working memory by the process in the initialization unit.

The selection unit 20002 performs the operations identical to the ones by the set of selection instructions 3002. More specifically, the selection unit 20002 randomly selects whether the process A or the process B proceeds. More specifically, the selection unit 20002 selects whether the block number holding unit that should be referred is the block number holding unit 301A or the block number holding unit 301B. Subsequently, the selection unit 20002 instructs the execution unit 20004 which is to be described later to execute the block corresponding to the block number held by the selected block number holding unit.

The instruction holding unit 20003 records each of the blocks generated from the set of original process instructions 10200 corresponding to the number for identifying the block. Each of the blocks to be recorded is identical to the ones in the first embodiment. Note that, in this example, there is not branching instruction within the block since the instruction for selecting the next block to the selection unit 20002 is performed by the execution unit 20004 to be described later.

The execution unit 20004 is specifically a CPU and others, and has a function for executing a program. The execution unit 20004 reads a block corresponding to the block number notified from the selection unit 20002 and executes the block. Furthermore, when the execution is completed, it requests the selection unit to select a block that should be executed next.

The description for the information processing device 20000 ends here.

Note that the operation of the information processing device 20000 is omitted since they are identical to the operations of the set of obfuscated instructions 3000.

Furthermore, descriptions for the processing device which performs the operations identical to the set of obfuscated instructions 14000 according to the second embodiment and the operations thereof are omitted since they are mostly the configurations described above modified according to the set of obfuscated instructions 14000.

(6) In the first embodiment, the loop is expanded, and in the second embodiment, the loop is set to be set of instructions to be selected as the loop. However, the present invention is not limited to this. The loop may be the set of instructions to be selected as the loop in the first embodiment, and the loop may be expanded in the second embodiment. These variations may be respectively implemented by processing the loop as described in the same manner as described in the embodiments.

(7) Two types of processes to be executed are shown in the first and second embodiments. However, it is needless to say that the present invention is not limited to this, and there may be more than three types of processes. In this case, the number of the block number holding unit that should be generated increases as many as the number of the processes. Furthermore, the selection by the set of selection instructions increases as many as the types of the processes. Note that, when the execution of all of the blocks belonging to the process is completed, the set of selection instructions 3002 randomly selects the process whose execution has not yet been completed.

(8) Execution order of the process A and the process B using the confidential information are switched in the first embodiment and execution order of the main process and the process in usage limit check are switched; however, the present invention is not limited to this. The present invention is applicable to any set of instructions as long as operations performed by the set of instructions can be classified into multiple processes.

Furthermore, in the first and second embodiments, an example where a set of original process instructions is obfuscated; however, the present invention is not limited to this. The present invention is also applicable to the case where multiple sets of original process instructions each of which performs a process. Note that, the number of given set of original process instructions may be the number of the process classification in this case. Accordingly, the process for checking the number of classifications may be omitted. However, even when multiple sets of original process instructions are given, the present invention may be applied by further classifying each set of original process instructions into further classifications.

(9) In the first and second embodiments, each block number holding unit holds the block number of the block to be executed next; however, the present invention is not limited to this. For example, if it is possible to find out the execution order of the block in each process can be found out, the block number of the blocks that have already been executed. In this case, the block number of the block that should be executed next can be specified from the block number of the block that has been executed previously. Accordingly, it is not necessary to hold the block number of the block to be executed next. In this case, the updating instruction in each block stores the block number of the block in the block number holding unit.

Note that there may be various methods to find out the information indicating the execution order of the blocks by holding the information in the set of obfuscated instructions in advance or by obtaining the information from outside. However, if the information itself is stolen by the unauthorized analysis significantly reduces safety. Accordingly it is preferable that the information is securely held and obtained.

Furthermore, updating of the block number held by each block number holding unit may not be necessary performed in each block. The block number may be updated anytime after the block that should be executed next is confirmed by referring to the block number held by the block number holding unit. For example, if the execution order of the block in each process is identified, the block number may be updated immediately after the execution of the set of selection instructions. Furthermore, the order may be held in the table, as in the variation (2) described above. More specifically, it is assumed to hold the block number of the block that should be executed obtained by the set of selection instructions and the block number that each block number holding unit holds. In this case, it is assumed that one updating instruction is provided as a whole, and the updating instruction referring to the table is executed after the set of selection instructions.

(10) In the first and second embodiments, the block number holding units are generated as many as the processes; however, the present invention is not limited to this. The plurality of block number holding units may be used for each process, and dummy block number holding unit that is not used for making the analysis difficult.

(11) In the first embodiment and second embodiment, a process is always selected; however, the present invention is not limited to this. For example, a dummy block for implementing the dummy processes which does not affect the execution result is prepared, and the process that should proceed. This means analysis will be even more difficult because the unauthorized analyzer performs analysis while understanding the meaningless block as well.

(12) There is a case in each process described in the first embodiment and the second embodiment may have different variables for storing the intermediate result of each process. Take, for example, the second embodiment, there is a case where the variables var_c1 to var_c3 are used in the blocks A10 to A19 for usage limit check, and where the other variables var_b1 to var_v3 are used in the blocks B20 to B25. In this case, the unauthorized analyzer performs an attack for extracting the processes in usage limit check by checking variables used in each block and by extracting the blocks where the variables var_c1 to var_c3. The blocks extracted this way would be 10 blocks which are the blocks for usage limit check (A10~A19). Accordingly, there is a possibility that the unauthorized analyzer think of tampering for invalidating the usage limit check by performing the analysis while understanding only 10 blocks which are the blocks for usage limit check that has been extracted. Accordingly, in order to prevent such attack, it is possible to make the tampering difficult by using the transformation with an identity, in addition to the obfuscation methods shown in the first and the second embodiments.

For example, suppose the block B21 in the main process is a process instruction "val_b1=val_b2^val_b3;". Here, ^ indicates exclusive OR. This is transformed by the identity such as a^b^a, which always equals to b. More specifically, when it is assumed that b is "val_b2^val_b3" and that a is a variable used for the usage limit check, the variable val_c1 is used in the block B21 in the main process. Accordingly, it would be difficult to determine whether the block is the block in the main process or the block in the usage limit check, based on the variable used in each block. Note that, analysis of the blocks for usage limit check can be made difficult by transforming the blocks into the process using the variables val_b1 to val_b3 used in the main process block.

Furthermore, although a method for changing the variable used in each block with an identity is shown; however, the variable may be changed using other known obfuscation methods.

(13) Each of the abovementioned devices is, more specifically, a computer system including a microprocessor, a ROM, a RAM, a hard disk unit, a display unit, a keyboard, and a mouse and others. A computer program is stored in the RAM or the hard disk unit. Each of the devices achieves its function with the microprocessor operating according to the computer program. Here, the computer program is configured with a combination of a plurality of instruction codes each of which indicates an instruction to a computer combined to achieve a predetermined function. Note that, each device may be a computer system not only a computer system including all of a microprocessor, a ROM, a RAM, a hard disk unit, a display unit, a keyboard, and a mouse, but a computer system configured with a part of them.

A part of, or all of the components of each device may be configured with a system Large Scale Integrated (LSI) circuit. The system LSI is a super multi-function LSI manufactured by integrating multiple components into one chip. More specifically, it is a computer system configured including a microprocessor, a ROM, a RAM, and others. The computer program is stored in the RAM. The system LSI achieves its function with the microprocessor operating according to the computer program.

Each unit of the components configuring each of the devices may be individually implemented as a chip, or may also be integrated into one chip so as to include a part of or all of them.

The name used here is LSI, but it may also be called IC, system LSI, super LSI, or ultra LSI depending on the degree of integration. Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

In the future, with advancement in manufacturing technology, a brand-new technology may replace LSI. The integration can be carried out by that technology. Application of biotechnology is one such possibility.

(15) A part of or all of the components configuring each device may also be configured with a detachable IC card attached to each device or a single module. The IC card or the module is a computer system configured of a microprocessor, a ROM, a RAM, and others. The IC card or the module may include the super multi-function LSI. The IC card or the module achieves its function with the microprocessor operating according to the computer program. This IC card or this module may have the anti-tampering property.

(16) The present invention may be the method shown above. Furthermore, it may be a computer program implementing these methods with a computer, or digital signals including the computer program.

Furthermore, the present invention may be achieved as the computer program or the digital signals recorded on the computer readable recording medium, for example, a flexible disk, a hard disk, a CD-ROM, an MO, a DVD, a DVD-ROM, a DVD-RAM, a Blu-ray Disc (BD), a semiconductor memory and others. Furthermore, it may be the digital signal recorded on the recording medium.

Furthermore, the present invention may be the computer program or the digital signals transmitted via an electric communication line, wireless or wired communication line, a network such as the Internet, a data broadcast and others.

Furthermore, the present invention may be a computer system including a microprocessor and a memory, and the computer program is stored in the memory, and the microprocessor operates according to the computer program.

Furthermore, by recording and transferring the program or the digital signals using the recording medium or by transferring the program or the digital signal via the network, it may be implemented by the other independent computer system.

(17) The embodiments and the modification may also respectively be combined.

The following is the further explanation. However, the next explanation is merely an example.

FIG. 2 shows a DVD recorder factory A.

The DVD recorder factory A includes an obfuscation device 8000.

The obfuscation device 8000 includes the storage medium 8000*a*. The storage medium 8000*a* stores the obfuscation program 8000*b*. The obfuscation device 8000 transforms the set of original process instructions 2000 into the set of obfuscated instructions 3000 by executing the stored obfuscation program 8000*b*. The obfuscation device 800 transforms the set of original process instructions 2000 into the set of obfuscated instructions 3000. Subsequently, the obfuscation device 8000 downloads the transformed set of obfuscated instructions 3000 into the storage medium 20000*a* provided in the DVD recorder 3000*y* when, for example, it receives an instruction by a user of the obfuscation device 8000 (the manufacturer of the DVD recorder 3000). With this, the obfuscation device 8000 installs the set of obfuscated instructions 3000 on the DVD recorder 3000*y*.

Note that, more specifically, the obfuscation device 8000 may be a universal personal computer. Additionally, the storage medium 8000*a* may be, specifically, a hard disk drive (HDD) included in a universal computer, for example.

The DVD recorder 3000*y* is a product manufactured by a manufacturer in the DVD recorder factory A. The DVD recorder 3000*y* includes storage medium 20000*a* and the storage medium 3000*r*. The storage medium 20000*a* stores the set of obfuscated instructions 3000. The set of obfuscated instructions 3000 transformed from set of original process instructions 2000 by the obfuscation device 8000 is downloaded in the storage medium 2000*a*, and the downloaded set of obfuscated instructions 3000 is stored thereon. Furthermore, the storage medium 3000*r* is a recording medium to which the DVD recorder 3000*y* stores the data by the set of original process instructions 2000 stored in the storage medium 2000*a* operating the DVD recorder 3000*y*. For example, the block number holding unit (the block number holding unit 301A and the block number holding unit 301B) to be described later is configured as a part of the storage medium 3000*r*.

Note that, more specifically, the storage medium 2000*a* may be a Read Only Memory (ROM). Furthermore, for example, the other storage medium 3000*r* may be, specifically, a Random Access Memory (RAM).

FIG. 3 shows the configuration of the set of original process instructions 2000.

FIG. 6 shows the detailed configuration of the set of original process instructions 2000.

The set of original process instructions 2000 includes the first set of instructions 2001 and the second set of instructions 2002. The second set of instructions 2002 includes the multiple times execution units (the block B2 and others) that are executed repeatedly for more than twice.

FIG. 4 shows the configuration of the set of obfuscated instructions 3000.

FIG. 7 shows the configuration of the first half 3000*a* of the set of obfuscated instructions 3000.

FIG. 8 shows the configuration of the latter half 3000*b* of the set of obfuscated instructions 3000.

The set of obfuscated instructions 3000 includes the set of initialization instructions 3001, the set of selection instructions 3002, the block number holding units (the block number holding unit 301A and the block number holding unit 301B), and the set of instructions to be selected 3003. The set of instructions to be selected 3003 includes the first set of instructions (the block A1 and others) corresponding to the first set of instructions 2001 (FIG. 6), and the second set of instructions (the block B1 and others) corresponding to the second set of instructions 2002. The second set of instructions in the set of instructions to be selected 3003 includes the multiple times execution units (the block B1 and others) corresponding to the multiple times execution units in the set of original process instructions 2000.

FIG. 5 shows the flowchart of the process performed by the DVD recorder 3000*y* with the set of obfuscated instructions 3000. More specifically, the flowchart of the process performed by the set of obfuscated instructions 3000.

FIG. 9 shows the configuration of the set of obfuscation device 8000.

The obfuscation device 8000 includes the input unit 801, the block splitting unit 802, the block number assigning unit 803, the set of initialization instructions generating unit 804, the set of selection instructions generating unit 805, the block updating unit 806, the instruction integration unit 807, and the output unit 808.

Note that these functional blocks may be functional blocks of the functions performed by the obfuscation device 8000 itself, by the obfuscation device 8000 performing the computer program installed in the obfuscation device 8000.

FIG. 10 shows a flowchart of the obfuscation device 8000.

Furthermore, the second embodiment is shown.

FIG. 16 shows the configuration of the set of original process instructions 10200 after transformation in the second embodiment. The transformed set of original process instructions 10200 includes the first set of instructions (A10 and others) including the multiple-times execution block, and the second set of instructions. FIG. 15 shows the second set of obfuscated instructions 14000 transformed by the obfuscation device 18000 in the second embodiment (FIG. 19) from the set of original process instructions 10200. FIG. 17 shows the detailed configuration of the first half 14000*a* of the second set of obfuscated instructions 14000. FIG. 18 shows the detailed configuration of the latter half of the second set of obfuscated instructions 14000. The second set of obfuscated instructions 14000 includes the set of initialization instructions 14001, the set of selection instructions 14002, the block number holding units (the block number holding unit 1401A and the block number holding unit 1401B), and the set of instructions to be selected 14003. FIG. 20 shows the process performed by the DVD recorder 3000*y* with the second set of obfuscated instructions 14000.

FIG. 19 shows the obfuscation device 18000. The obfuscation device 18000 includes the input unit 801, the block splitting unit 1802, the dependent unit 1909, the block number assigning unit 803, the set of initialization instructions generating unit 1804, the set of selection instructions generating unit 1805, and the block updating unit 1806, the instruction integration unit 1807, and the output unit 808.

An obfuscation device (the obfuscation device 8000, the obfuscation device 18000) which generates a set of obfuscated instructions (the set of obfuscated instructions 3000) executed by the execution device (the DVD recorder 3000*y*) by obfuscating a set of original process instructions (the set of original process instructions 2000), the set of obfuscated instructions being executed by the execution device, the obfuscation device comprising: a storage unit (the recording medium 8000*r* provided in the obfuscation device 8000 in FIG. 2) configured to store the set of original process instructions (the set of original process instructions 2000) including a first set of instructions and a second set of instructions, the first set of instructions being for performing a first process (the first process 2001 in FIG. 3), and the second set of instructions being for performing a second process (the second process 2002) and the second set of instructions including a loop instruction for repeatedly performing at least a part of the second process; a dividing unit (the block splitting unit 802) configured to respectively divide the first set of instructions and the second set of instructions into a plurality of instruction blocks; an assigning unit (the block number assigning unit 803) configured to assign identification information (block number) to each of the plurality of instruction blocks; a first instruction generating unit (the set of initialization instructions generating unit 804) configured, for each of the first process and the second process, to generate an initialization instruction (the set of initialization instructions 3001), the initialization instruction being for securing a management area in the execution device (the recording medium 3000r of the DVD 300y, for example), the management area (the block number holding unit (the block number holding unit 301A and the block number holding unit 301B) being for managing the identification information indicating an instruction block that should be executed next to each of the first process and the second process, and to store the initialization instruction in the storage unit; a second instruction generating unit (the set of selection instructions generating unit 805) configured to generate a selection instruction (the set of selection instructions 3002) (i) to make a first selection form the first process and the second process selecting from a process that should be proceeded, (ii) to make a second selection for selecting an instruction block indicated by the identification information (for example, the block number of the block A3) managed in the management area, as an instruction block that should be executed for proceeding with one of the first process and the second process selected by the first selection, and (iii) to generate selection instruction for causing the execution device to execute the instruction block selected by the second selection, and store the selection instruction in the storage unit; a third instruction generating unit (the block updating unit 806) configured to generate an updating instruction (the updating instruction 313A) for updating, when the second process is selected by the first selection, and when the loop instruction included in the second process is executed, the identification information (the block number of the block A4, for example) regarding the first process managed in the management area to identification information indicating an instruction block to be executed next to the first process which is selected by the first selection, and to store the updating instruction in the storage unit; and a set of instruction generating unit (the instruction integration unit 807) configured to generate the set of obfuscated instructions based on the initialization instruction, the selection instruction, the updating instruction, and the plurality of instruction blocks assigned with the identification information and to store the set of obfuscated instructions in the storage unit is configured.

According to this obfuscation device, the process is selected by the first selection by the generated selection instruction, and the executions of the first process and the second process are mixed. This achieves a sufficient obfuscation. Furthermore, despite the sufficient obfuscation, the management area is secured by the generated initialization instruction; the identification information managed in the secured management area is updated to an appropriate identification information. This prevents the execution of an inappropriate instruction block. More specifically, the instruction block to be executed is an appropriate instruction block. Put differently, the order of the executed instruction block is held in an appropriate order without changed from an appropriate order. Accordingly, it is possible to cause an appropriate instruction block to be executed despite the sufficient obfuscation. In other words, it is possible to achieve both sufficient obfuscation and the appropriate instruction block to be executed.

INDUSTRIAL APPLICABILITY

The program according to the present invention takes a form which is hard for an unauthorized analyzer to analyze, and thus it is useful in an area such as software for performing a process using confidential information which would be disadvantageous when leaked to the unauthorized analyzer. Furthermore, the program obfuscation device according to the present invention is useful in the area such as software for performing a process using confidential information which would be disadvantageous when leaked to the unauthorized analyzer, because it is possible to transform a program handling confidential information such as encrypted key into a form more difficult to be analyzed.

What is claimed is:

1. An obfuscation device which generates a set of obfuscated instructions by obfuscating a set of original process instructions, the set of obfuscated instructions being executed by an execution device, said obfuscation device comprising:
   a storage unit configured to store the set of original process instructions including a first set of instructions and a second set of instructions, the first set of instructions being for performing a first process, and the second set of instructions being for performing a second process and the second set of instructions including a loop instruction for repeatedly performing at least a part of the second process;
   a dividing unit configured to respectively divide the first set of instructions and the second set of instructions into a plurality of instruction blocks;
   an assigning unit configured to assign identification information to each of the plurality of instruction blocks;
   a first instruction generating unit configured, for each of the first process and the second process, to generate an initialization instruction, the initialization instruction being for securing a management area in said execution device, the management area being for managing the identification information indicating an instruction block that should be executed next to each of the first process and the second process, and to store the initialization instruction in said storage unit;
   a second instruction generating unit configured to generate a selection instruction (i) to make a first selection from the first process and the second process selecting from a process that should be proceeded, (ii) to make a second selection for selecting an instruction block indicated by the identification information managed in the management area, as an instruction block that should be executed for proceeding with one of the first process and the second process selected by the first selection, and (iii) to generate selection instruction for causing the execution device to execute the instruction block selected by the second selection, and store the selection instruction in said storage unit;
   a third instruction generating unit configured to generate an updating instruction for updating, when the second process is selected by the first selection, and when the loop instruction included in the second process is executed, the identification information regarding the first process managed in the management area to identification information indicating an instruction block to be executed next to the first process which is selected by the first selection, and to store the updating instruction in said storage unit; and a set of instruction generating unit configured to generate the set of obfuscated instructions based on the initialization instruction, the selection instruction, the updating instruction, and the plurality of instruction blocks assigned with the identification information and to store the set of obfuscated instructions in said storage unit.

2. The obfuscation device according to claim 1, wherein at least one of the first set of instructions and the second set of instructions includes a conditional branching instruction which performs conditional branching according to a value of a variable, said obfuscation device further comprises:

a dependent unit configured to replace an instruction block in a branch indicated by the conditional branching instruction or an instruction block to be executed after the branch with a dependent block, dependent block being for performing (i) an operation which can obtain a result identical to a result of the process by the instruction block before the replacement in the case where a value to be assigned to the variable is a value that should be assigned to the variable when the conditional branching instruction branches to the branch, and (ii) an operation which can obtain a result different from the result by the instruction block in the case where a value to be assigned to the variable is a value different from a value that should be assigned when the conditional branching instruction branches to the branch; and a deletion unit configured to delete the conditional branching instruction from the instruction block including the conditional branching instruction.

3. The obfuscation device according to claim 1, wherein said second instruction generating unit is configured to generate an instruction for selecting, at random, a process one of the first process and the second process as the selection instruction.

4. The obfuscation device according to claim 3, wherein the plurality of instruction blocks includes a dependent block, the plurality of instruction blocks implementing at least one of the first process and the second process, and the dependent block performing an operation dependent on a process result of a process other than the implemented process, and said second instruction generating unit is configured to generate, as the select instruction, an instruction for selecting only an instruction block different from instruction blocks after the dependent block until the process result of the other process is obtained.

5. The obfuscation device according to claim 3, wherein said dividing unit is configured to expand the loop by the loop instruction and divide the loop when the second set of instructions are divided, and said third instruction generating unit is configured to generate an instruction, as the updating instruction for each of the instruction blocks corresponding to the repeat in the expanded loop, (i) for updating the identification information to first updated identification information indicating an instruction block located in the beginning of the loop when the instruction block is an instruction block corresponding to any of the repeat in the loop except for the last repeat in the loop, and (ii) for updating the identification information to second updated identification information indicating an instruction block to be executed after the repeat in the loop is finished when the instruction block is an instruction block corresponding to the last repeat in the loop.

6. The obfuscation device according to claim 3, wherein said third instruction generating unit is configured to generate an instruction, as the updating instruction for the instruction block that is executed last in the loop by the loop instruction, (i) for updating the identification information to updated identification information indicating an instruction block in the beginning of the loop when the instruction block is executed in any of the repeat in the loop except for the last repeat in the loop, and (ii) for updating the identification information to an instruction block executed after the repeat in the loop ends when the instruction block is executed in the last repeat in the loop.

7. An obfuscation method which generates a set of obfuscated instructions by obfuscating a set of original process instructions, the set of obfuscated instructions being executed by an execution device, said obfuscation method comprising:

storing, in a storage unit, the set of original process instructions including a first set of instructions and a second set of instructions, the first set of instructions being for performing a first process, and the second set of instructions for performing a second process and including a loop instruction for repeatedly performing at least a part of the second process;

dividing, respectively, the first set of instructions and the second set of instructions into a plurality of instruction blocks;

assigning identification information to each of the plurality of instruction blocks;

generating, for each of the first process and the second process, an initialization instruction, the initialization instruction being for securing a management area in said execution device, the management area being for managing the identification information indicating an instruction block that should be executed next to each of the first process and the second process, and storing the initialization instruction in the storage unit;

generating a selection instruction to (i) make a first selection selecting from the first process and the second process selecting from a process that should be proceeded, (ii) make a second selection for selecting an instruction block indicated by the identification information managed in the management area, as an instruction block that should be executed for proceeding with one of the first process and the second process selected by the first selection, and (iii) generate selection instruction for causing the execution device to execute the instruction block selected by the second selection, and storing the selection instruction in the storage unit;

generating an updating instruction for updating, when the second process is selected by the first selection, and when the loop instruction included in the second process is executed, the identification information regarding the first process managed in the management area to identification information indicating an instruction block to be executed next in the first process which is selected by the first selection, and storing the updating instruction in the storage unit; and generating the set of obfuscated instructions based on the initialization instruction, the selection instruction, the updating instruction, and the plurality of instruction blocks assigned with the identification information, and storing the set of obfuscated instructions in the storage unit.

8. A computer program recorded on a non-transitory computer-readable recording medium, for generating a set of obfuscated instructions, by obfuscating a set of original process instructions, the set of obfuscated instructions being executed by an execution device, said computer program causing a computer to execute:

storing, in a storage unit, the set of original process instructions including a first set of instructions and a second set of instructions, the first set of instructions being for performing a first process, and the second set of instructions for performing a second process and including a loop instruction for repeatedly performing at least a part of the second process;

dividing, respectively, the first set of instructions and the second set of instructions into a plurality of instruction blocks;

assigning identification information to each of the plurality of instruction blocks;

generating, for each of the first process and the second process, an initialization instruction, the initialization instruction being for securing a management area in said execution device, the management area being for managing the identification information indicating an instruction block that should be executed next to each of the first process and the second process, and storing the initialization instruction in the storage unit;

generating a selection instruction to (i) make a first selection selecting from the first process and the second process selecting from a process that should be proceeded, (ii) make a second selection for selecting an instruction block indicated by the identification information managed in the management area, as an instruction block that should be executed for proceeding with one of the first process and the second process selected by the first selection, and (iii) generate selection instruction for causing the execution device to execute the instruction block selected by the second selection, and storing the selection instruction in the storage unit;

generating an updating instruction for updating, when the second process is selected by the first selection, and when the loop instruction included in the second process is executed, the identification information regarding the first process managed in the management area to identification information indicating an instruction block to be executed next in the first process which is selected by the first selection, and storing the updating instruction in the storage unit; and generating the set of obfuscated instructions based on the initialization instruction, the selection instruction, the updating instruction, and the plurality of instruction blocks assigned with the identification information, and storing the set of obfuscated instructions in the storage unit.

9. An integrated circuit which generates a set of obfuscated instructions by obfuscating a set of original process instructions, the set of obfuscated instructions being executed by an execution device, said integrated circuit comprising:

a storage unit configured to store the set of original process instructions including a first set of instructions being and a second set of instructions, the first set of instructions being for performing a first process, and the second set of instructions for performing a second process and including a loop instruction for repeatedly performing at least a part of the second process;

a dividing unit configured to respectively divide the first set of instructions and the second set of instructions into a plurality of instruction blocks;

an assigning unit configured to assign identification information to each of the plurality of instruction blocks;

a first instruction generating unit configured, for each of the first process and the second process, to generate an initialization instruction, the initialization instruction being for securing a management area in said execution device, the management area being for managing the identification information indicating an instruction block that should be executed next to each of the first process and the second process, and to store the initialization instruction in said storage unit;

a second instruction generating unit configured to generate a selection instruction (i) to make a first selection from the first process and the second process selecting a process that should be proceeded, (ii) to make a second selection selecting an instruction block indicated by the identification information managed in the management area, as an instruction block that should be executed for proceeding with one of the first process and the second process selected by the first selection, and (iii) to generate selection instruction for causing the execution device to execute the instruction block selected by the second selection, and store the selection instruction in said storage unit;

a third instruction generating unit configured to generate an updating instruction for updating, when the second process is selected by the first selection, and when the loop instruction included in the second process is executed, the identification information regarding the first process managed in the management area to identification information indicating an instruction block to be executed next to the first process which is selected by the first selection, and to store the updating instruction in said storage unit; and a set of instruction generating unit configured to generate the set of obfuscated instructions based on the initialization instruction, the selection instruction, the updating instruction, and the plurality of instruction blocks assigned with the identification information, and to store the set of obfuscated instructions in said storage unit.

* * * * *